(12) United States Patent
Okuno et al.

(10) Patent No.: US 11,137,082 B2
(45) Date of Patent: *Oct. 5, 2021

(54) ANGLE TYPE CHECK VALVE

(71) Applicant: Three-M Industry Co., Ltd., Osaka (JP)

(72) Inventors: Hideo Okuno, Osaka (JP); Hiroshi Kaimoto, Osaka (JP); Takeshi Takahashi, Osaka (JP); Nobuya Uda, Osaka (JP); Takanori Hashihira, Osaka (JP)

(73) Assignee: Three-M Industry Co., Ltd., Osaka (JP)

( * ) Notice: Subject to any disclaimer, the term of this patent is extended or adjusted under 35 U.S.C. 154(b) by 473 days.

This patent is subject to a terminal disclaimer.

(21) Appl. No.: 16/310,179

(22) PCT Filed: Feb. 16, 2018

(86) PCT No.: PCT/JP2018/005507
§ 371 (c)(1),
(2) Date: Dec. 14, 2018

(87) PCT Pub. No.: WO2019/058580
PCT Pub. Date: Mar. 28, 2019

(65) Prior Publication Data
US 2021/0222782 A1    Jul. 22, 2021

(30) Foreign Application Priority Data
Sep. 21, 2017 (JP) .............................. JP2017-181376

(51) Int. Cl.
*F16K 15/00* (2006.01)
*F16K 15/03* (2006.01)

(52) U.S. Cl.
CPC ............ *F16K 15/03* (2013.01); *F16K 15/033* (2013.01); *Y10T 137/7668* (2015.04); *Y10T 137/7898* (2015.04)

(58) Field of Classification Search
CPC ......... Y10T 137/7898; Y10T 137/7504; Y10T 137/7903; Y10T 137/79; F16K 27/0227; F16K 15/033
See application file for complete search history.

(56) References Cited

U.S. PATENT DOCUMENTS 3,996,962 A * 12/1976 Sutherland .............. E03C 1/106
137/527.4
4,188,973 A * 2/1980 Weise .................... F16K 15/033
137/514

(Continued)

FOREIGN PATENT DOCUMENTS

JP    2003-4152 A    1/2003
JP    2016-75356 A   5/2016

*Primary Examiner* — Robert K Arundale
(74) *Attorney, Agent, or Firm* — Crowell & Moring LLP

(57) ABSTRACT

There is provided an angle type check valve which enables simple and quick replacement operations of a valve body and a valve seat without releasing a piping coupled state and has excellent maintainability. In the angle type check valve according to the present invention, as a valve unit, a valve seat, a valve body, and a hinge mechanism are integrally assembled so as to be made into a unit part. The valve unit is attachable to and detachable from a unit fitting portion in the valve box main body. A gripping member is provided on the valve seat. As a result, access to the valve unit attached to the unit fitting portion through the access hole becomes remarkably easier. Therefore, a maintenance operator can perform a fitting operation and a removal operation of the valve unit to and from the unit fitting portion quickly with high work efficiency.

5 Claims, 13 Drawing Sheets

(56) References Cited

U.S. PATENT DOCUMENTS

| | | | | |
|---|---|---|---|---|
| 5,107,888 A * | 4/1992 | Dunmire | ............... | E03C 1/106 |
| | | | | 137/512 |
| 5,156,183 A * | 10/1992 | Scaramucci | ......... | F16K 15/033 |
| | | | | 137/454.2 |
| 5,711,341 A * | 1/1998 | Funderburk | ......... | F16K 15/033 |
| | | | | 137/454.6 |
| 5,794,655 A * | 8/1998 | Funderburk | ......... | F16K 15/033 |
| | | | | 137/454.6 |
| 6,343,618 B1 * | 2/2002 | Britt | ................. | F16K 15/035 |
| | | | | 137/527 |
| 2003/0168105 A1 * | 9/2003 | Funderburk | ......... | F16K 15/035 |
| | | | | 137/527.2 |

* cited by examiner

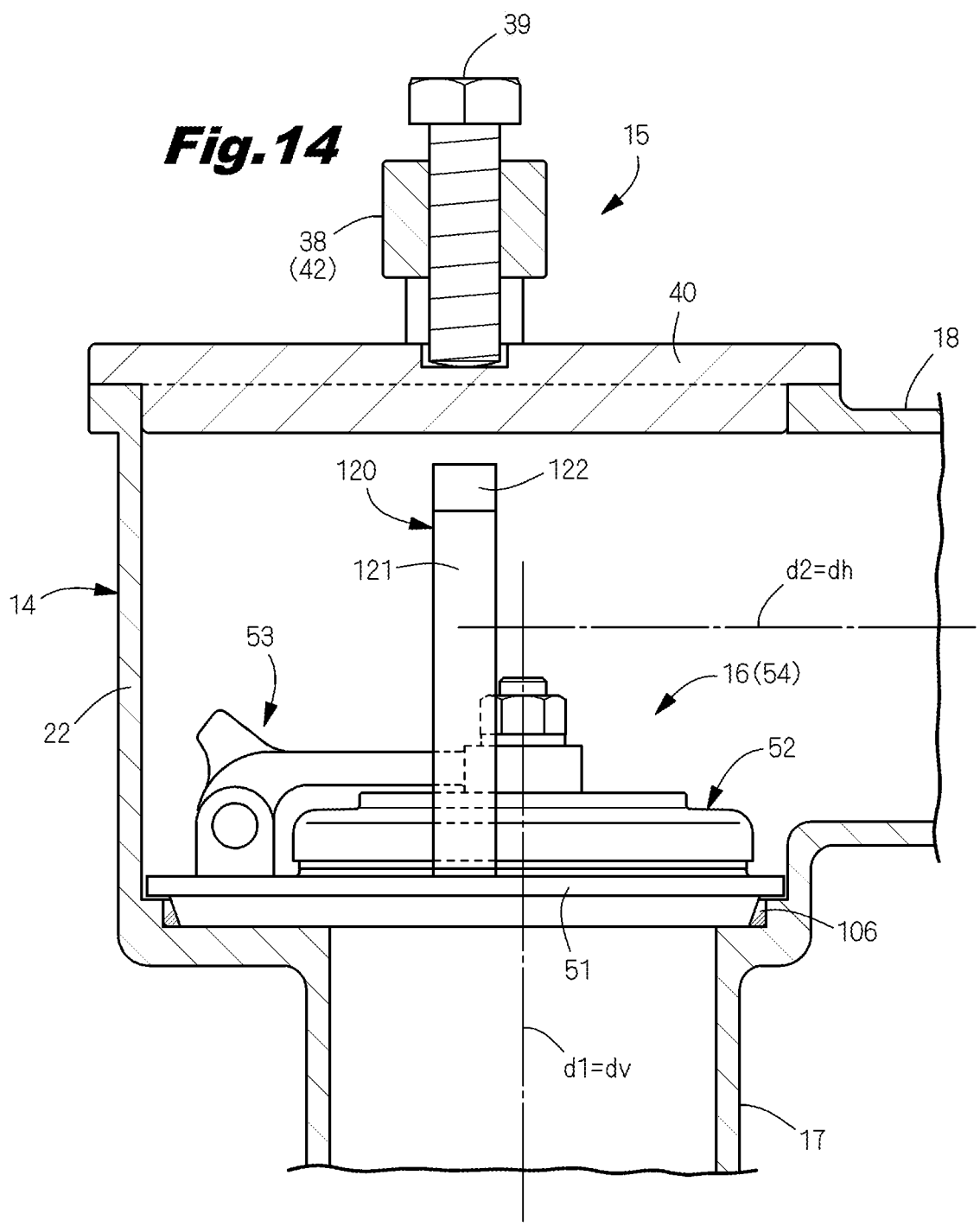

ANGLE TYPE CHECK VALVE

TECHNICAL FIELD

The present invention relates to an angle type check valve, and particularly relates to a technique for improving maintainability.

BACKGROUND ART

Patent Literature 1 discloses a technique of improving maintainability by allowing a packing member of a valve body to be easily replaced when the packing member deteriorates with age due to long-term use in an angle type check valve in which an opening direction of an inlet port of a primary side into which a fluid flows and an opening direction of an outlet port of a secondary side through which a fluid flows out are perpendicular to each other, and the technique is known. The check valve disclosed in Patent Literature 1 is a lift type check valve in which a valve body linearly and reciprocatingly swings in a direction of approaching or separating from a valve seat, and the valve body includes a sealing body which seals the valve seat and the valve body. The sealing body has a cartridge structure in which a base member detachably fitted to the valve body and a packing member sealing the valve seat and the valve body in an airtight or liquid-tight manner are integrated. An upper opening of a valve box is sealed by a cap portion which is freely releasable by a ferrule joint. A straight cylindrical portion is formed in the cap portion. The cap portion is configured such that when a valve stem constituting the valve body is inserted into the straight cylindrical portion, the valve body can move in the axial direction along the straight cylindrical portion. A spring member is fitted on the outer peripheral surface of the straight cylindrical portion, and the valve body is pressed downward by urging force of the spring member.

In the check valve disclosed in Patent Literature 1 configured as described above, the ferrule joint is released and a cap is removed, the valve body is taken out from the valve box, and then a base member is removed from the valve body. Thus, it is possible to replace the entire sealing body including the packing member.

In contrast, Patent Literature 2 discloses a technique of improving maintainability by integrating a valve seat, a valve body which rotates about a hinge shaft, and the like in a swing type check valve including the valve body. In the check valve disclosed in Patent Literature 2, a water stopping portion including the valve seat, the valve body, and the like is configured to be attachable to and detachable from a casing that is a valve box. Note that the valve disclosed in Patent Literature 2 is a straight type check valve in which an inlet port and an outlet port are formed at locations on a right-left straight line of the casing.

CITATION LIST

Patent Literature

Patent Literature 1: JP 2016-075356 A
Patent Literature 2: JP 2003-004152 A

SUMMARY OF INVENTION

Technical Problems

The inventors of the present invention have considered adopting a swing type in which a valve body rotates about a hinge shaft as an operation mode of the valve body in an angle type check valve due to an advantage of being able to reduce pressure loss when the check valve is fully opened, the advantage of reducing cracking pressure, or the like. In addition, the inventors considered enabling the valve body and the like to be easily replaced also in the angle type check valve having a swing type operation mode as described above so as to improve maintainability. However, in contrast to the check valve disclosed in Patent Literature 1 in which a replacement operation of the sealing body can be performed outside the valve box by performing the operation of removing the cap and the operation of taking out the valve body from the valve box, the operation of releasing the valve body from the hinge shaft and the like are necessary in order to take out the valve body from the valve box, in the swing type check valve. Therefore, there is no denying that it is impossible to improve maintainability even if applying the structure of the sealing body of Patent Literature 1 as it is to the swing type check valve. In addition, in the check valve of Patent Literature 1, only the packing member of the valve body can be replaced, and it is particularly impossible to replace the valve seat.

In addition, in a case where an angle type check valve of this kind is applied to a ground (offshore) installation-type foot valve of a pumping system provided at a coupling portion between a suction pipe extending in the vertical direction and a transfer pipe extending in the horizontal direction, it is required to be able to replace only the valve body or the like installed in the valve box without releasing the coupled state between the suction pipe and the check valve or the coupled state between the transfer pipe and the check valve, in order to improve maintainability. However, in a configuration as in Patent Literature 2 where a water stopping portion is inserted into a casing from an inlet port or an outlet port, it is necessary to release the connected state of piping to the inlet port or the outlet port in order to replace the water stopping portion. Therefore, there is no denying that it is inappropriate to apply the configuration of the check valve as in Patent Literature 2 to the foot valve of the pumping system.

An object of the present invention is to provide an angle type check valve which enables simple and quick replacement operations of a valve body and a valve seat without releasing a piping coupled state and has excellent maintainability.

Solution to Problems

The present invention is directed to an angle type check valve including: a valve box main body 14 which is provided with an inflow port 21 opened on a lower side, an outflow port 23 opened on a lateral side, and an access hole 20 opened on an upper side, and in which a valve chamber 49 is formed that has a bent shape and extends from the inflow port 21 toward the outflow port 23; a lid body 15 which is configured to be attachable to and detachable from the valve box main body 14 so as to seal the access hole 20; a valve seat 51 which is provided with a valve port 50 at a central portion of the valve seat 51; a valve body 52 which is configured to be capable of changing posture between opening posture for opening the valve port 50 and a closing posture for closing the valve port 50; and a hinge mechanism 53 which supports the valve body 52 such that the valve body 52 can swing between the opening posture and the closing posture and which includes a hinge shaft 93 and an urging member 94 that urges the valve body 52 toward the closing posture. As a valve unit 54, the valve seat 51, the valve body 52, and the hinge mechanism 53 are integrally assembled so as to be made into a unit part. The valve unit 54 is configured so as to be attachable to and detachable from a unit fitting portion 102 provided in the valve box main body 14. The valve seat 51 is provided with a gripping member 120 configured to perform a fitting operation of the valve unit 54 to the unit fitting portion 102 through the access hole 20 or a removal operation of the valve unit 54 from the unit fitting portion 102 through the access hole 20, and the gripping member 120 is formed so as to avoid the swing locus of the valve body 52 about the hinge shaft 93.

The gripping member 120 includes a pair of pillar bodies 121, 121 erected upward from an upper surface of the valve seat 51 and a beam body 122 bridged between upper end portions of the pillar bodies 121, 121.

A mode may be adopted in which the pillar bodies 121, 121 are erected at locations facing each other across a disc surface central portion of the valve seat 51, and the arrangement direction of the two pillar bodies 121, 121 defined by connecting the formation positions of the two pillar bodies 121, 121 coincides with the extending direction of the hinge shaft 93.

An engagement regulating structure 110 which regulates assembling posture of the valve unit 54 to the unit fitting portion 102 may be provided between the unit fitting portion 102 and the valve unit 54.

The unit fitting portion 102 may be configured of an attachment surface 103 which is directed upward and at a center portion of which the inflow port 21 is opened, and a fitting wall 104 which is erected so as to surround the attachment surface 103. The engagement regulating structure 110 may be configured of a protruding portion 111 protruding inward from an inner peripheral surface of the valve box main body 14, and a recessed portion 112 formed by notching an outer peripheral surface of the valve seat 51 of the valve unit 54 to receive the protruding portion 111.

Advantageous Effects of Invention

In the angle type check valve according to the present invention, as the valve unit 54, the valve seat 51, the valve body 52, and the hinge mechanism 53 are integrally assembled so as to be made into a unit part. Therefore, by only replacing the valve unit 54, it is possible to replace the valve seat 51, the valve body 52, and the like in a single operation. Therefore, a maintenance operation of the check valve can be performed quickly and easily with less trouble. Since it is possible to perform a replacement operation of the valve unit 54 through the access hole 20, the angle type check valve according to the present invention is advantageous also in that it is possible to perform the replacement operation of the valve unit 54 while maintaining the connected state of piping without releasing the connected state of the piping.

In addition, in the angle type check valve according to the present invention, the gripping member 120 is provided on the valve seat 51. Therefore, even though the unit fitting portion 102 is formed so as to face the inflow port 21 provided on the lower side of the valve box main body 14, in other words, even though the unit fitting portion 102 is formed on the lower side of the valve chamber 49, access to the valve unit 54 through the access hole 20 becomes remarkably easier. Therefore, a maintenance operator can perform a fitting operation and a removing operation of the valve unit 54 to and from the unit fitting portion 102 quickly with high work efficiency.

Incidentally, in the case of adopting a mode of not including a gripping member 120, in order to access a valve unit 54 through an access hole 20, it is necessary for a maintenance operator to insert his fingers deep into a valve chamber 49, and in addition, in order to lift the valve unit 54 from a unit fitting portion 102 during a removal operation, it is necessary to grip any member located on the upper side of the valve unit 54 such as a hinge shaft 93 or a valve body 52 with fingers. Therefore, in the case of adopting a mode of not including the gripping member 120, the skill degree of the operator or the difference in physical strength of the operators such as force of fingers has a great influence. In a case where a non-skilled person or a person with little force of fingers performs an operation, it takes time and trouble to perform the removal operation. The above problem becomes conspicuous in a case where the valve unit 54 sticks to the unit fitting portion 102 due to the effect of a long-term change, rust, or dirt. In addition, when the hinge shaft 93, the valve body 52, or the like is gripped with fingers during the fitting operation, there is a possibility that the fingers inadvertently contact an urging member 94 and installation failure such as a change in posture or dropout of the urging member 94 occurs, resulting in malfunction of the angle type check valve.

In contrast, if the gripping member 120 is provided on the valve seat 51 as in the present invention, during the removal operation, the maintenance operator can reliably apply force to the valve unit 54 to release the engagement state between the unit fitting portion 102 and the valve unit 54 and can lift the valve unit 54 only by inserting his fingers into the valve chamber 49 through the access hole 20 and gripping the gripping member 120. Therefore, the influence of the skill degree of the operator and the influence of difference in physical strength of the operators can be reduced, and the maintenance operator can perform the removal operation with high work efficiently. The fingers are not brought into contact with the urging member 94, and it is possible to reliably prevent occurrence of an installation failure during the fitting operation. As described above, according to the angle type check valve according to the present invention including the gripping member 120, the maintenance operator can perform the fitting operation and the removal operation of the valve unit 54 to and from the unit fitting portion 102 quickly with high work efficiency.

For example, in a case of adopting a mode in which the gripping member 120 is provided on a valve body 52, if the gripping member 120 is gripped and pulled upward, the valve body 52 rotates about a hinge shaft 93. Therefore, it becomes difficult to hold the valve unit 54 in desired posture and it is difficult to accurately transmit lifting force acting on the gripping member 120 to the valve unit 54. As a result, in the case of adopting the mode in which the gripping member 120 is provided on the valve body 52, a maintenance operator cannot efficiently perform a fitting operation and a removal operation of the valve unit 54. In contrast, if the gripping member 120 is provided on the valve seat 51 as in the present invention, even when the gripping member 120 is gripped and pulled upward, it is easy to hold the valve unit 54 in desired posture, and it is possible to accurately transmit the lifting force acting on the gripping member 120 to the valve unit 54. Therefore, the maintenance operator can efficiently perform the fitting operation and the removing operation of the valve unit 54.

If the gripping member 120 is provided so as to avoid the swing locus of the valve body 52 about the hinge shaft 93, due to provision of the gripping member 120, the swing limit of the valve body 52 in the opening direction can be prevented from becoming small. This means that it is possible to prevent the feed amount of the check valve from decreasing due to provision of the gripping member 120, and therefore it is possible to secure the feed amount satisfactorily. In addition, when the posture of the valve body 52 is changed between the closing posture and the opening posture, it is possible to prevent the valve body 52 from colliding with the gripping member 120. Therefore, it is possible to prevent the gripping member 120 or the valve body 52 from being damaged. As a result, since it is not necessary to take special measures for improving rigidity of the gripping member 120, it is possible to suppress an increase in cost due to the provision of the gripping member 120.

As described above in detail, according to the angle type check valve according to the present invention, the maintenance operation such as the replacement operation of the valve unit 54 can be easily and quickly performed with less trouble without releasing the connected state of the piping. Therefore, according to the present invention, it is possible to obtain the angle type check valve having excellent maintainability.

The gripping member 120 may include the pair of pillar bodies 121, 121 erected upward from the upper surface of the valve seat 51 and the beam body 122 bridged between the upper end portions of the pillar bodies 121, 121. As a result, for example, it is possible to apply lifting force to the valve seat 51 through the pillar bodies 121, 121 only by gripping and lifting upward the beam body 122, and to provide the gripping member 120 with excellent operability. The number of constituent parts of the gripping member 120 can be reduced, and an increase in cost due to the provision of the gripping member 120 can be suppressed.

If the pillar bodies 121, 121 are erected at locations facing each other across the disc surface central portion of the valve seat 51, for example, in comparison with a case of adopting a configuration where both two pillar bodies 121, 121 are disposed at locations shifted to a lateral side of the valve seat 51, operating force for the valve unit 54 applied through the beam body 122 can be uniformly applied to entirety of the disc surface of the valve seat 51. Therefore, the maintenance operator can efficiently perform the fitting operation and the removal operation of the valve unit 54. If the configuration is adopted in which the arrangement direction of the two pillar bodies 121, 121 defined by connecting the formation positions of the two pillar bodies 121, 121 coincides with the extending direction of the hinge shaft 93, it is possible to prevent the beam body 122 from interfering with the valve body 52 while suppressing the height dimension of the pillar bodies 121, 121. Therefore, it is possible to suppress an increase in height dimension of the valve box main body 14 due to provision of the gripping member 120, and to contribute to size reduction of the angle type check valve.

If the engagement regulating structure 110 for regulating the assembling posture of the valve unit 54 to the unit fitting portion 102 is provided between the unit fitting portion 102 and the valve unit 54, it is possible to prevent a shift in position of the valve unit 54 in the unit fitting portion 102, such as rotation of the valve unit 54 and to always hold the valve unit 54 at proper posture position in the unit fitting portion 102. Specifically, the engagement regulating structure 110 may be configured of the protruding portion 111 protruding inward from the inner peripheral surface of the valve box main body 14, and the recessed portion 112 formed by notching the outer peripheral surface of the valve seat 51 of the valve unit 54 so as to receive the protruding portion 111.

BRIEF DESCRIPTION OF DRAWINGS

FIG. 14 is a longitudinal cross-sectional front view of a main part of an angle type check valve according a third embodiment of the present invention.

DESCRIPTION OF EMBODIMENT

First Embodiment

Figure 1:
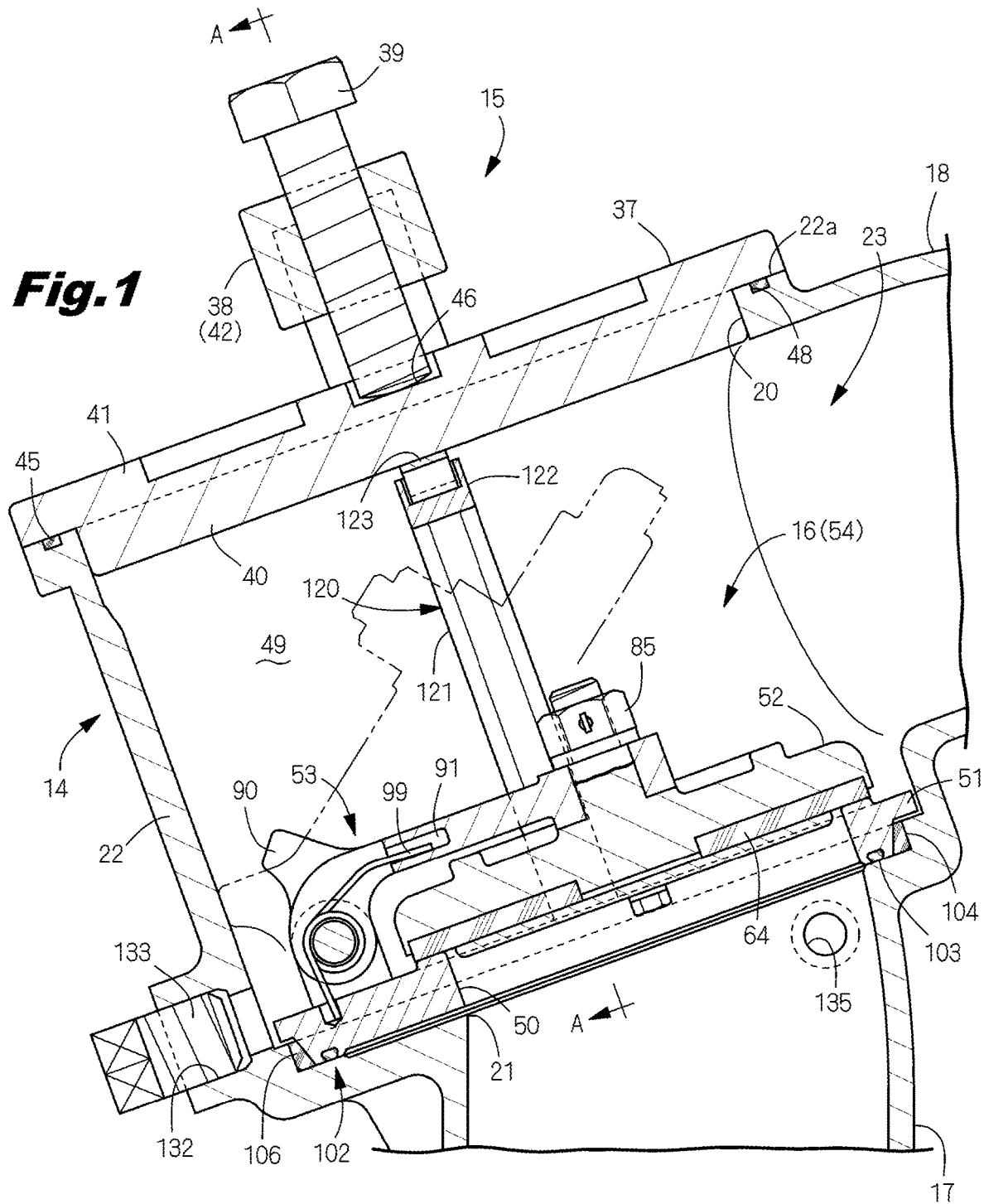
FIG. 1 is a longitudinal cross-sectional front view of a main part of an angle type check valve according a first embodiment of the present invention.
Figure 2:
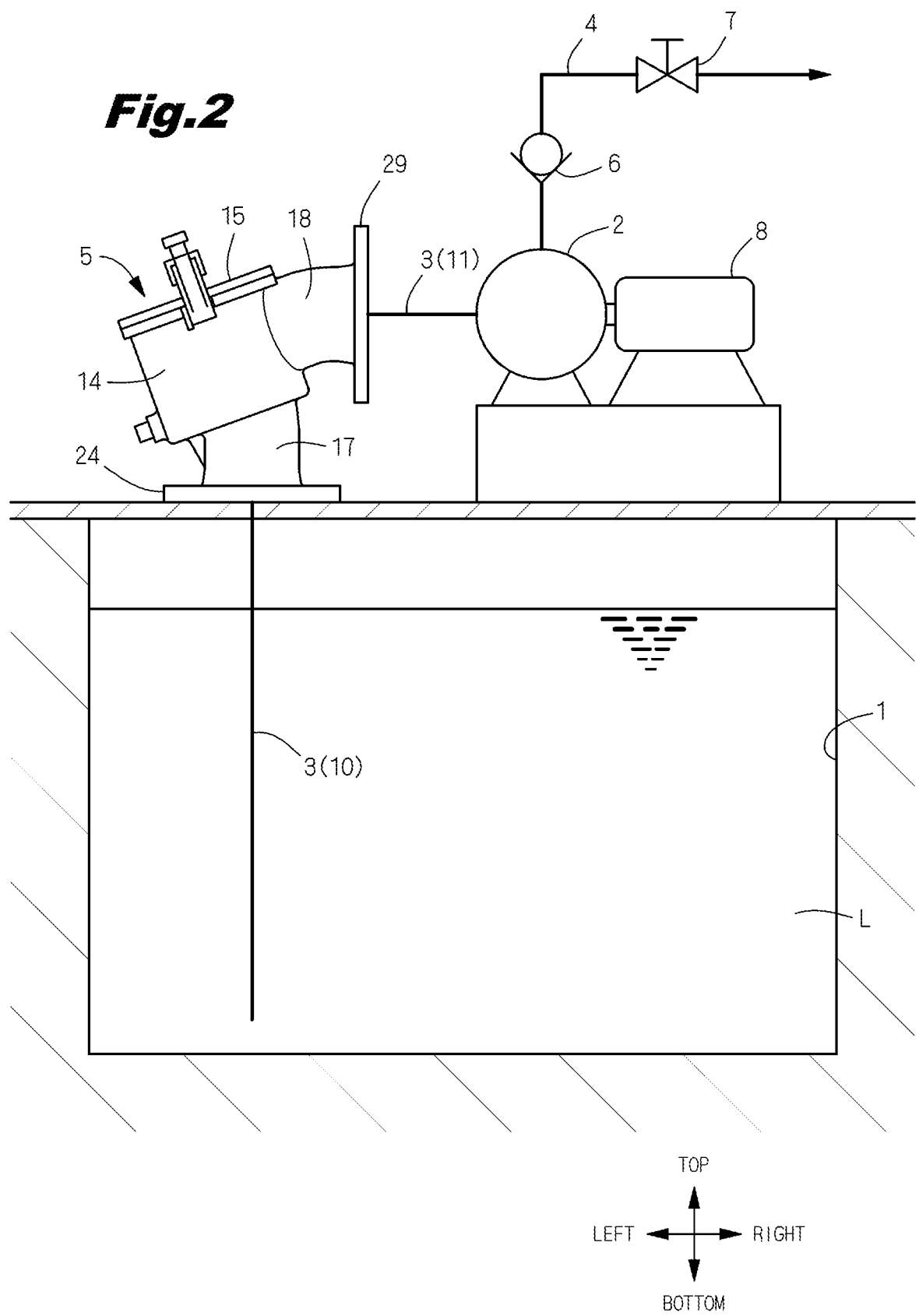
FIG. 2 is a schematic view illustrating the entire configuration of a pumping system to which the angle type check valve is applied.

FIGS. 1 to 10 illustrate a first embodiment in which an angle type check valve according to the present invention is applied to a ground installation-type foot valve of a pumping system. Front and rear, left and right, and top and bottom in the present embodiment follow intersecting arrows illustrated in FIGS. 2, 3, 4, and 5 and indications of front and rear, left and right, top and bottom denoted near the respective arrows. As illustrated in FIG. 2, the pumping system is configured of a liquid reservoir 1 that stores a liquid L, a pump 2 that pumps the liquid L from the liquid reservoir 1, a liquid suction pipe 3 that is provided between the liquid reservoir 1 and the pump 2, a discharge pipe 4 that is connected to the discharge side of the pump 2, a foot valve 5 that is provided in the middle of the liquid suction pipe 3, and a check valve 6 and an opening/closing valve 7 that are provided in the middle of the discharge pipe 4. In FIG. 2, a reference sign 8 denotes a motor for driving the pump 2.

The liquid suction pipe 3 is configured of a suction pipe 10 installed in an upright posture and having a lower end immersed in the liquid reservoir 1, and a transfer pipe 11 installed in a lying posture on the ground. The right end portion of the transfer pipe 11 is coupled to the pump 2, and the left end portion of the transfer pipe 11 is coupled to the foot valve 5. The upper end portion of the suction pipe 10 is coupled to the lower end of the foot valve 5. The foot valve 5 is installed on the ground (offshore).

Figure 3:
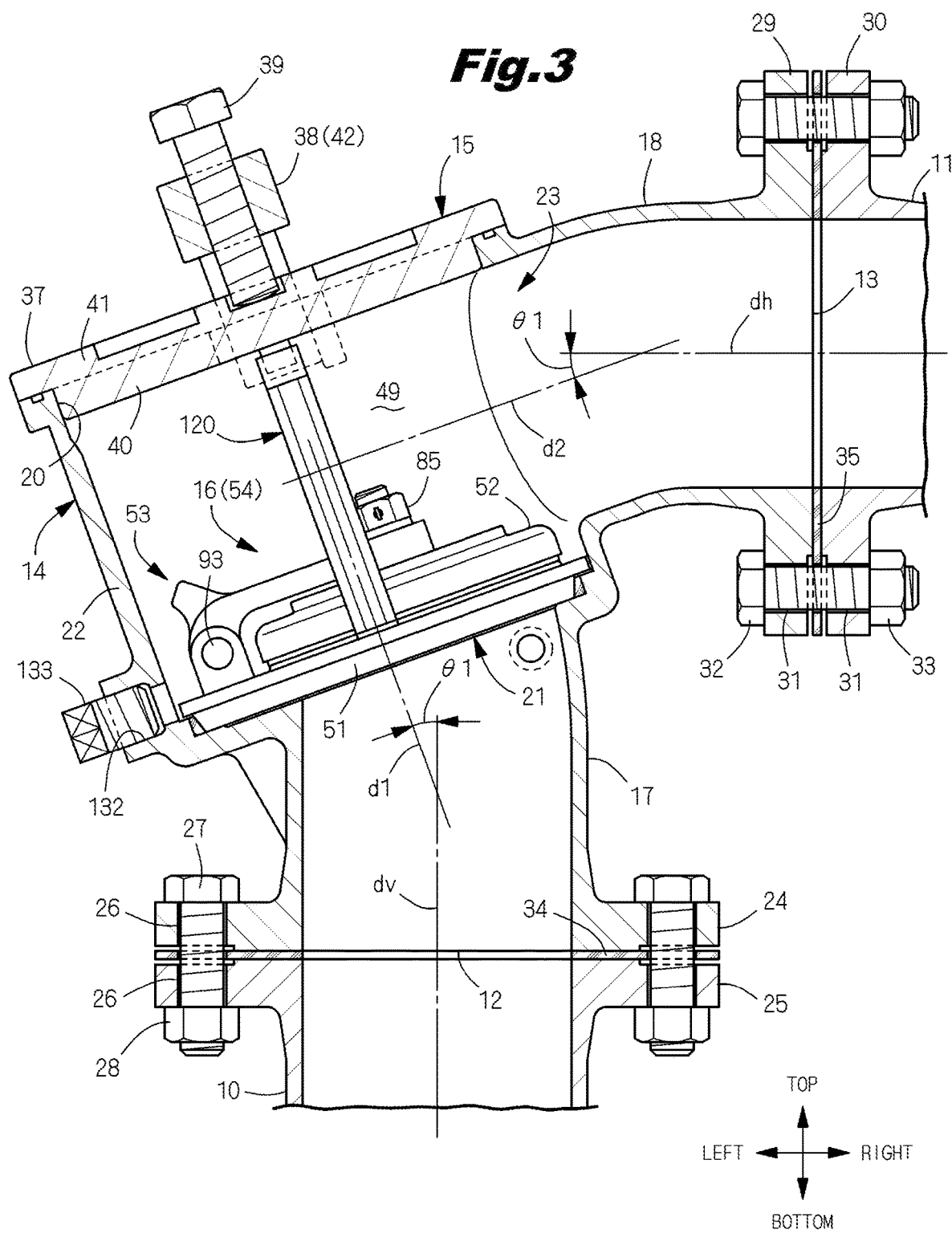
FIG. 3 is a longitudinal cross-sectional front view of the angle type check valve.

As illustrated in FIGS. 2 and 3, the foot valve 5 is an angle type check valve in which an opening direction of an inlet port 12 of a primary side into which a liquid L flows and an opening direction of an outlet port 13 of a secondary side through which the liquid L having flowed through the inlet port 12 flows out are perpendicular to each other. Here, the inlet port 12 is opened to the lower side and the outlet port 13 is opened to the right side. As illustrated in FIG. 3, the foot valve 5 includes a valve box main body 14, a lid body 15 configured so as to be attachable to and detachable from the valve box main body 14, a water stopping portion 16 assembled in the valve box main body 14, an inflow cylinder 17 provided below the valve box main body 14, an outflow cylinder 18 provided on a lateral side of the valve box main body 14, and the like. An opening at the lower end of the inflow cylinder 17 is the inlet port 12 and an opening of the right end of the outflow cylinder 18 is the outlet port 13.

Figure 7:
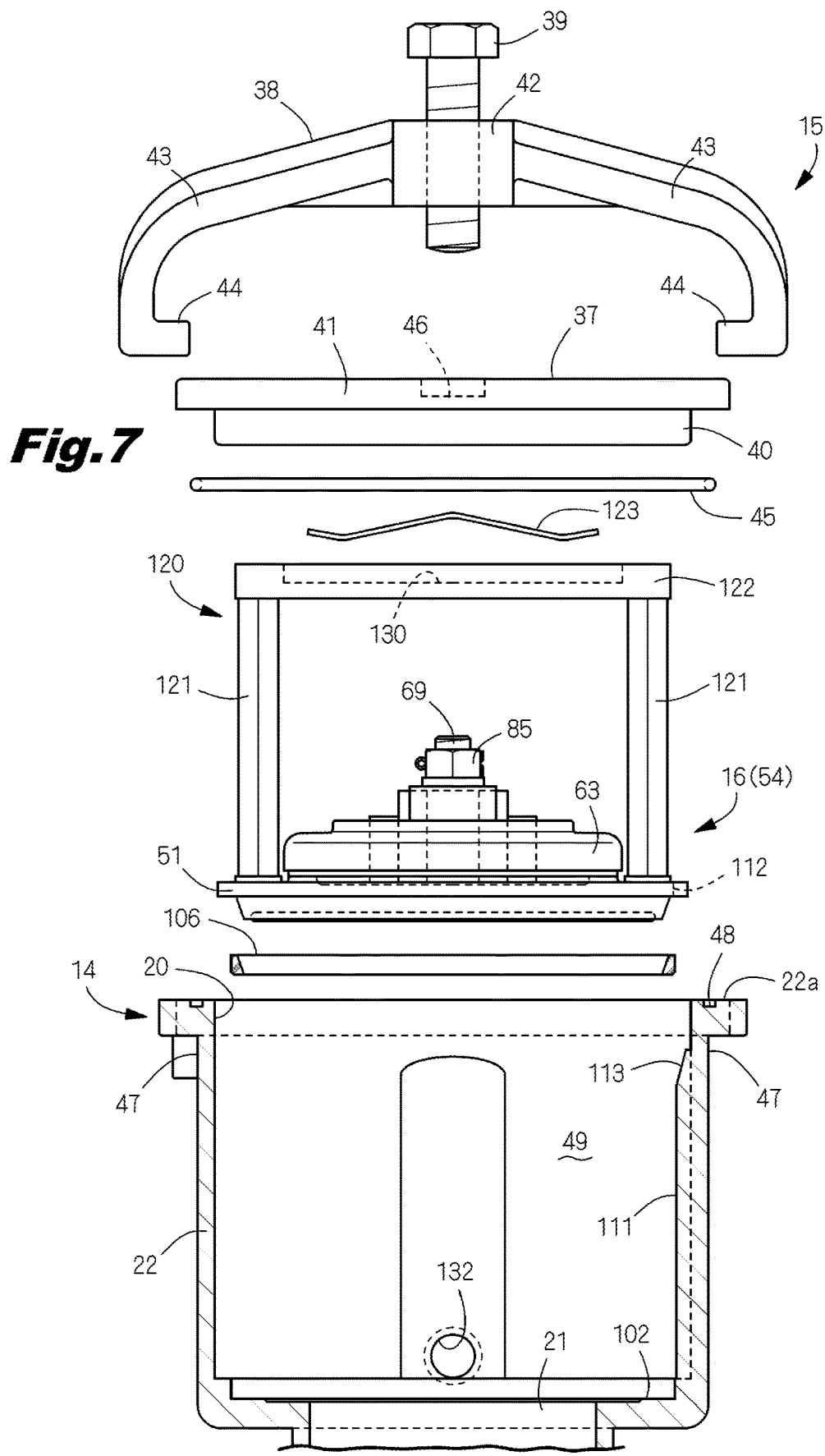
FIG. 7 is an exploded view of the angle type check valve.

As illustrated in FIGS. 1, 3, and 7, the valve box main body 14 is a substantially cylindrical metal molded product having an access hole 20 at the upper end side and an inflow port 21 at the lower end side, and an outflow port 23 is opened in a cylinder wall 22 on the right side. As a result, a valve chamber 49 which has a bent shape and extends from the inflow port 21 on the lower side to the outflow port 23 on the right side is formed inside the valve box main body 14. As illustrated in FIG. 3, the valve box main body 14 is set in an inclined posture in which the upper end side thereof is oriented diagonally upward to the left and the lower end side thereof is directed obliquely downward to the right, the axis direction (d1) of the cylinder is inclined at θ1° with respect to the vertical direction (dv), and the radial direction (d2) of the cylinder perpendicular to the axis direction (d1) is inclined at θ1° with respect to the horizontal direction (dh). It is preferable that θ1 is not less than 10° and not greater than 40° (10°≤θ1≤40°), and θ1 is set to 20° in the present embodiment. As described above, the inflow cylinder 17 is provided below the valve box main body 14, and the outflow cylinder 18 is provided on the right side of the valve box main body 14. In the present embodiment, the valve box main body 14, the inflow cylinder 17, and the outflow cylinder 18 are integrally formed of a cast product.

Flanges 24, 25 are provided at the lower end of the inflow cylinder 17 and the upper end of the suction pipe 10, respectively. The flanges 24 and 25 of the inflow cylinder 17 and the suction pipe 10 are abutted against each other, bolts 27 are passed through a plurality of bolt holes 26 provided in both the flanges 24, 25, and both the flanges 24, 25 are fastened with nuts 28, and thus the inflow cylinder 17 and the suction pipe 10 are coupled. Similarly, flanges 29, 30 are provided at the right end of the outflow cylinder 18 and the left end of the transfer pipe 11, respectively. The flanges 29, 30 of the outflow cylinder 18 and the transfer pipe 11 are abutted against each other, bolts 32 are passed through a plurality of bolt holes 31 provided in both the flanges 29, 30, the flanges 29, 30 are fastened with nuts 33, and thus the outflow cylinder 18 and the transfer pipe 11 are coupled. The coupling section between the inflow cylinder 17 and the suction pipe 10 is sealed with a ring-shaped packing 34. Similarly, the coupling section between the outflow cylinder 18 and the transfer pipe 11 is sealed with a ring-shaped packing 35. The axis direction of the inflow cylinder 17 and the suction pipe 10 is oriented in the vertical direction (dv), and the axis direction of the outflow cylinder 18 and the transfer pipe 11 is oriented in the left-right horizontal direction (dh).

Figure 4:
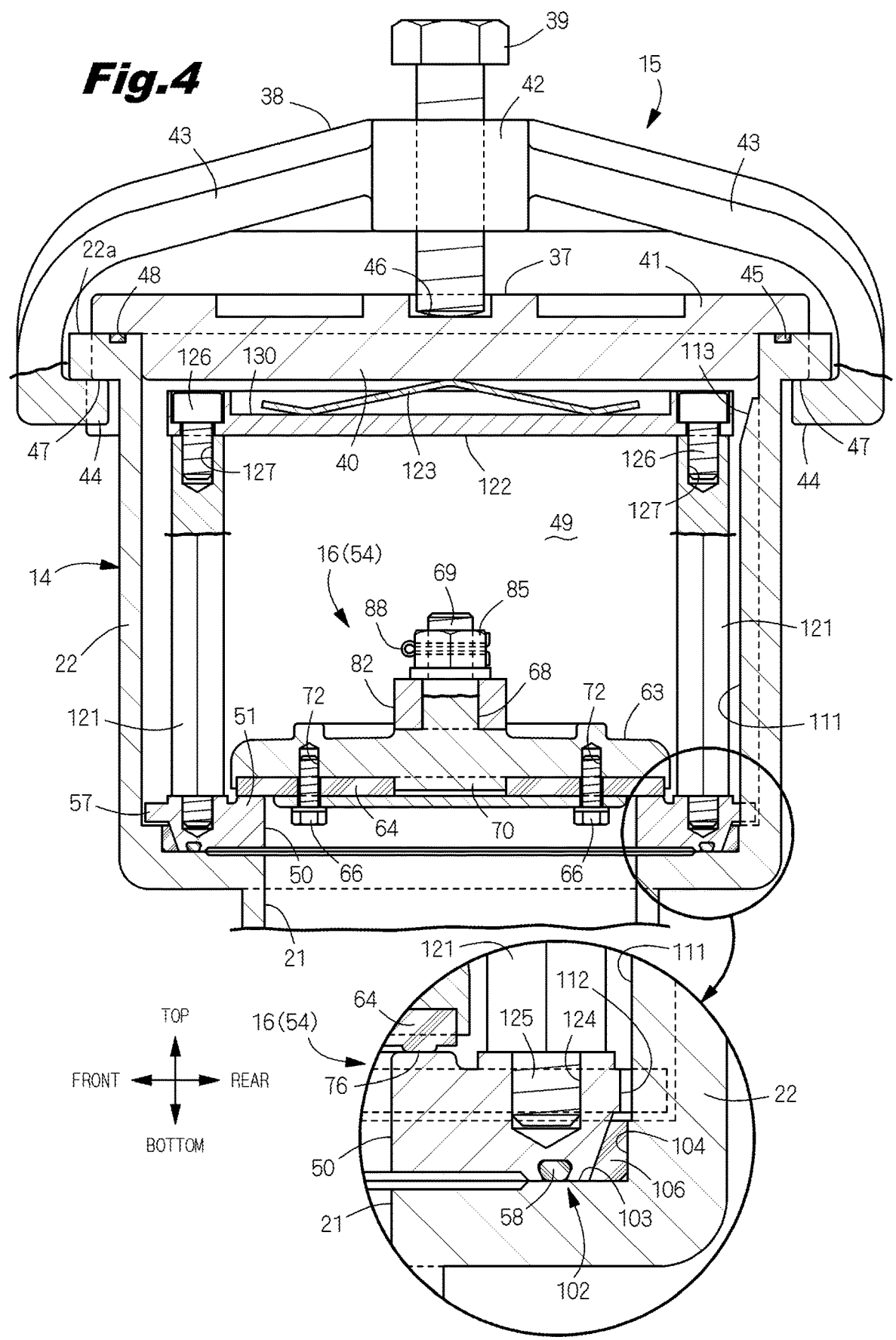
FIG. 4 is a cross-sectional view taken along line A-A in FIG. 1.

As illustrated in FIGS. 1, 4, and 7, the lid body 15 detachably fitted in the access hole 20 of the valve box main body 14 is configured of a lid main body 37 that is dropped in and fitted in the access hole 20, a support 38 that is horizontally bridged in a detachable manner on the upper end of the box body 14, and an operation bolt 39 that presses down the lid body 37. The lid main body 37 is made of a cast product that has a small-diameter back lid portion 40 that is internally fitted to the inside of the access hole 20, and a large-diameter front lid portion 41 that is provided on the back lid portion 40 and is received on a cylinder end surface 22a on the upper side of the valve box main body 14. The support 38 is made of a cast product integrally including a hub 42 that has a female screw portion to which a male screw portion of the operation bolt 39 is screwed and engaged, a pair of front and rear arm portions 43, 43 that extend from the outer periphery of the hub 42 towards both front and rear ends, and a retaining claw 44 that is provided on each of the front ends of the arm portions 43 and extends inwardly. A fitting groove 47 is formed in each of the outer peripheral surfaces of the valve box main body 14 in the front and rear direction. By aligning the retaining claws 44 with the openings of these fitting grooves 47, rotating the support body 38 clockwise as viewed from above, and inserting and engaging the retaining claws 44 into and with the fitting grooves 47, the support body 38 can be fitted to the valve box main body 14. In addition, by rotating the support 38 counterclockwise as viewed from above from the above fitted state in the reverse procedure, the engagement state between the fitting grooves 47 and the retaining claws 44 is released and the support 38 can be removed from the valve box main body 14. As illustrated in FIGS. 1, 3, and 4, after the support 38 is fitted to the valve box main body 14, the operation bolt 39 is rotated clockwise to shift the operation bolt 39 downward. Thus, the lid main body 37 is pressed down and the outer peripheral edge of the front lid portion 41 is press-fitted to the cylinder end surface 22a of the valve box main body 14, so that the lid body 15 can be fitted and fixed to the valve box main body 14. A ring-shaped water stopping packing 45 is disposed on the cylinder end surface 22a of the valve box main body 14. The water stopping packing 45 seals a gap between the cylinder end surface 22a and the outer peripheral edge of the front lid portion 41 in the fitted and fixed state of the lid body 15. A recess 46 that receives the lower end of the operation bolt 39 is formed in the upper surface of the front lid portion 41. Reference sign 48 denotes a recessed groove which is provided in the cylinder end surface 22a and to which the water stopping packing 45 is fitted.

Figure 8:
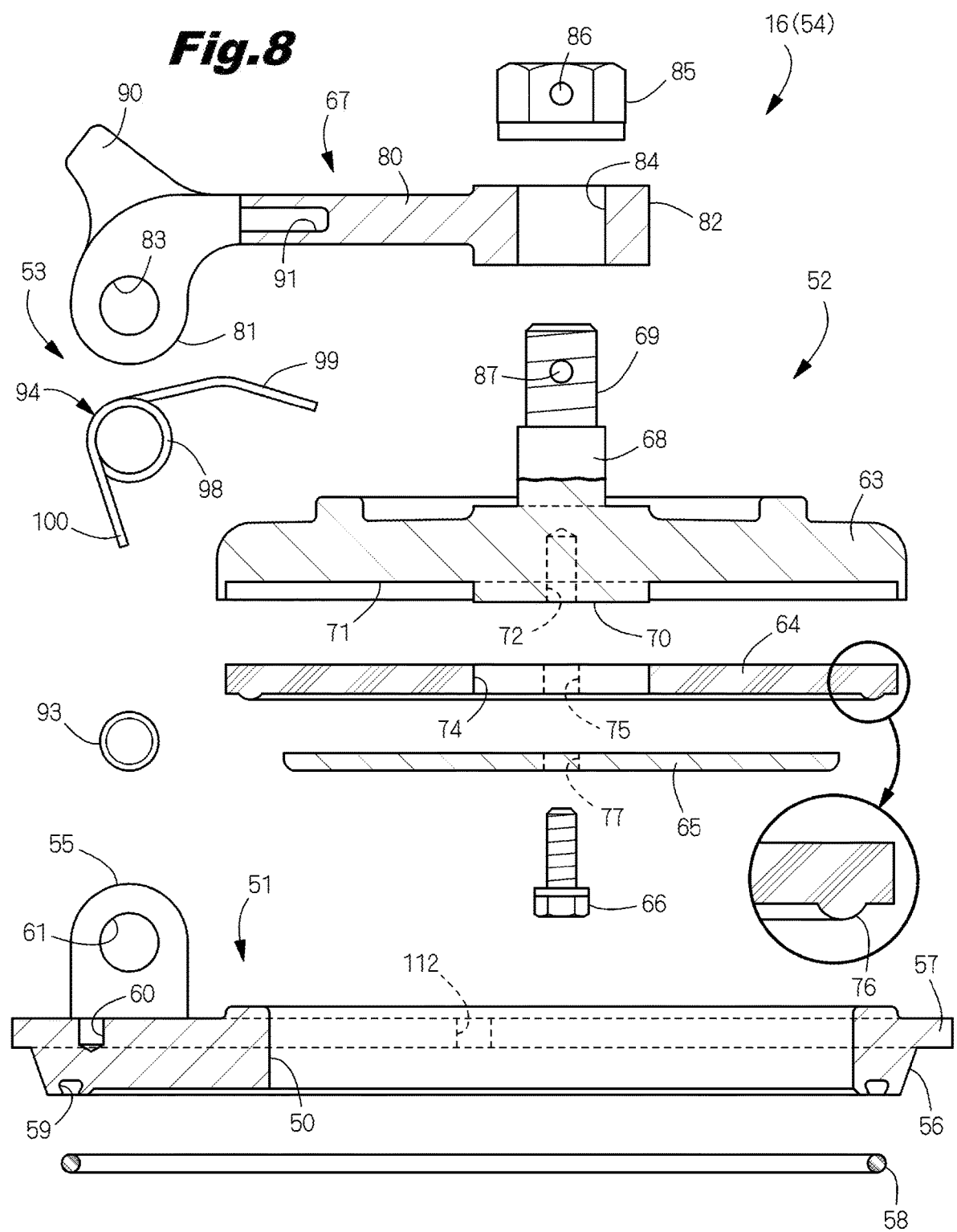
FIG. 8 is an exploded view of a valve unit.

As illustrated in FIG. 1 and FIG. 8, the water stopping portion 16 assembled in the valve chamber 49 is made into a unit part as a swing type valve unit 54 including a valve seat 51 which is provided with a valve port 50 at a central portion thereof, a valve body 52 which is configured to be capable of changing posture between opening posture for opening the valve port 50 and a closing posture for closing the valve port 50, and a hinge mechanism 53 which supports the valve body 52 such that the valve body 52 can swing between the opening posture and the closing posture.

As illustrated in FIG. 8, the valve seat 51 is a substantially disc-shaped metal molded product which includes the valve port 50 provided at the central portion thereof and having an opening dimension substantially equal to the opening dimension of the inflow port 21. On the upper surface on the left end side of the valve seat 51, a pair of front and rear hinge brackets 55, 55 for pivotally supporting a hinge arm 67 provided on the valve body 52 through the hinge shaft 93 is provided in a protruding manner. The valve seat 51 is configured of a lower seat portion 56 having a downwardly tapered circumferential surface, and an upper seat portion 57 having a straight circumferential surface in which the outer-diameter dimension is uniform in the top-bottom direction.

The outer-diameter dimension of the upper seat portion 57 is larger than that of the lower seat portion 56. The hinge bracket 55 is provided on the upper surface of the upper seat portion 57. On the lower surface of the lower seat portion 56, a ring-shaped loading groove 59 for fitting a seal ring 58 is recessed. Reference sign 60 denotes a spring receiving hole which is recessed between the hinge brackets 55 on the upper surface of the upper seat portion 57 and into which the front end of a spring arm 100 of a presser spring 94 to be described later is inserted. Reference sign 61 denotes a bearing hole provided in the hinge bracket 55.

The valve body 52 is configured of a valve body main body 63, a packing member 64 disposed on the lower surface of the valve body main body 63, a protective plate 65 disposed on the lower surface of the packing member 64, a pair of front and rear bolts 66, 66 for fixing the packing member 64, a hinge arm 67 for supporting the valve body main body 63, and the like. The valve body main body 63 is a cast product formed in a disc shape, and a round shaft-shaped boss 68 is provided at the center of a disc surface on the upper surface. A male screw portion 69 for coupling the hinge arm 67 is engraved in the upper end of the boss 68. A hub 70 is provided on the lower surface of the valve body main body 63, and a fitting portion 71 for the packing member 64 is recessed so as to surround the hub 70. Female screw portions 72 for the pair of bolts 66 are engraved in the lower surface of the valve body main body 63 so as to sandwich of the hub 70 from front and the rear (see FIG. 4).

The packing member 64 is made of an elastic member such as rubber, and is formed in a ring shape having a central opening 74. Through holes 75 for the bolts 66 are formed at the front and rear of the packing member 64 so as to sandwich the central opening 74. Reference sign 76 denotes a ring-shaped seal piece that is integrally provided in a protruding manner on the lower surface of the packing member 64 so as to surround the valve port 50. The seal piece 76 is formed in a protruding arc shape in cross-sectional view, and is configured such that in the closing posture in which the valve body 52 closes the valve port 50, the front end of the protruding arc is crushed to form a trapezoidal shape having a flat surface in cross-sectional view (see FIG. 6). The protective plate 65 is a metal molded product formed in a disc shape. Through holes 77 for the bolts 66 are opened at two places in the front and rear of the center of the disc surface of the protective plate 65. By inserting the packing member 64 into the fitting portion 71 and disposing the protective plate 65 on the lower surface of the packing member 64 and screwing the bolts 66 into the female screw portions 72 of the valve body main body 63 through the through holes 75, 77, the packing member 64 can be fitted and fixed to the lower surface of the valve body main body 63 in a state of being supported by the protective plate 65 from below.

The hinge arm 67 is a cast product integrally including a swing arm 80 extending in the left-right direction, a pair of front and rear round cylindrical bearings 81 provided on the left side of the swing arm 80, and a round cylindrical boss 82 provided on the right side of the swing arm 80. A bearing hole 83 opening in the front-rear direction is formed in the each bearing 81, and a coupling hole 84 opening in the top-bottom direction is formed in the boss 82. By passing the male screw portion 69 through the coupling hole 84 and externally fitting the coupling hole 84 to the boss 68, and screwing and fitting the nut 85 to the male screw portion 69, the valve body main body 63 can be coupled to the hinge arm 67. Pin holes 86, 87 for inserting a pin 88 (see FIG. 4) for preventing rotation of the nut 85 are opened in the nut 85 and the male screw portion 69, respectively. The inner-diameter dimension of the coupling hole 84 is set to be slightly larger than the outer-diameter dimension of the boss 68. In the above-described coupled state, the coupling hole 84 is fitted to the round shaft-shaped boss 68 with a slight clearance. Thus, in the coupled state, the valve body main body 63 is rotatable about the boss 68 with respect to the hinge arm 67, and in addition, is movable slightly in the top-bottom direction with respect to the hinge arm 67. As described, if the valve body main body 63 is configured to be rotatable with respect to the hinge arm 67 and to be also movable in the top-bottom direction, even if there is a variation in dimension of the valve seat 51, the valve body 52, the hinge arm 67, or the like due to a molding error or the like, this variation can be absorbed and the valve body 52 can always be in proper closing posture.

On an upper surface of the bearing 81, a regulating protrusion (protruding portion) 90 is provided in a protruding manner so as to contact the inner peripheral surface of the cylinder wall 22 of the valve box main body 14 and regulate the swing limit of the valve body 52 in the opening posture. At a base end portion on the left side of the swing arm 80, a recessed insertion portion 91 having an opening on the left side and allowing the spring arm 99 of the presser spring 94 to be inserted therein is formed.

The hinge mechanism 53 is configured of the hinge shaft 93, the hinge brackets 55, the hinge arm 67, and the pair of front and rear presser springs (urging members) 94. The hinge shaft 93 is a round shaft-shaped metal molded product (see FIG. 5).

Each presser spring 94 is a torsion coil spring made of a metal wire material such as spring steel, and includes a coil portion 98 externally fitted to the hinge shaft 93 and a pair of spring arms 99, 100 projecting from both sides of the coil portion 98. The spring arm 99, which is one of the pair of spring arms, is inserted into the recessed insertion portion 91 of the hinge arm 67 and the spring arm 100, which is the other of the pair of spring arms, is inserted into a spring receiving hole 60 of the valve seat 51. As a result, it is possible to swing and urge the valve body 52 toward the closing posture.

Upon assembly of the hinge mechanism 53, the hinge arm 67 and the presser springs 94, 94 are disposed between the pair of front and rear hinge brackets 55, 55, and then the hinge shaft 93 is inserted from the front side so as to pass through three parts, that is, the bearing holes 61 of the hinge brackets 55, 55, the coil portion 98 of each presser spring 94, and the bearing hole 83 of the hinge arm 67. Before or after the above-described operation of inserting the hinge shaft 93, insertion of the spring arm 99 into the recessed insertion portion 91 and insertion of the spring arm 100 into the spring receiving hole 60 are performed. In this manner, the valve body 52 can be coupled to the valve seat 51 so as to be swingable between the closing posture illustrated by a solid line in FIG. 1 and the opening posture illustrated by an imaginary line in FIG. 1.

The valve unit 54 configured as described above is configured to be attachable to and detachable from the unit fitting portion 102 provided on the peripheral edge of the opening facing the inflow port 21, in the valve box main body 14. As illustrated in FIG. 1, the unit fitting portion 102 is configured of an attachment surface 103 which is directed upward and at a center portion of which the inflow port 21 is opened, and a fitting wall 104 which is erected so as to surround the attachment surface 103. The attachment surface 103 constituting the unit fitting portion 102 is formed in an inclined posture inclined upward to the right in which the left side is lower and the right side is higher. Here, similarly to the radial direction (d2) of the cylinder of the valve box main body 14, the inclination angle of the attachment surface 103 is inclined at a gentle angle of θ1° (20°) with respect to the horizontal direction (dh). The inner-diameter dimension of the fitting wall 104 is set to be larger than the outer-diameter dimension of the lower seat portion 56 of the valve seat 51 and smaller than the outer-diameter dimension of the upper seat portion 57 of the valve seat 51. By dropping the valve unit 54 in the unit fitting portion 102 from above, it is possible to set the valve unit 54 in a unit fitting posture in which the lower surface of the lower seat portion 56 is received on the attachment surface 103. The valve unit 54 in the unit fitting posture is in an inclined posture inclined upward to the right. More specifically, as illustrated in FIGS. 1 and 3, a configuration is adopted in which when the valve unit 54 is set in the unit fitting posture, the hinge shaft 93 constituting the hinge mechanism 53 is in a posture extending in the front-rear direction, and the hinge shaft 93 is positioned at the lower left end of the valve box main body 14, and the valve seat 51 and the valve body 52 (the valve body 52 in the closing posture) are in an inclined posture gently inclined upward to the right. In addition, a configuration is adopted in which when the valve body 52 is opened to the swing limit about the hinge shaft 93 as illustrated by the imaginary lines in FIG. 1, the valve body 52 is in an inclined posture inclined steeply upward to the right in which the lower surface of the valve body 52 is oriented toward the outflow port 23 on the right side.

Figure 6:
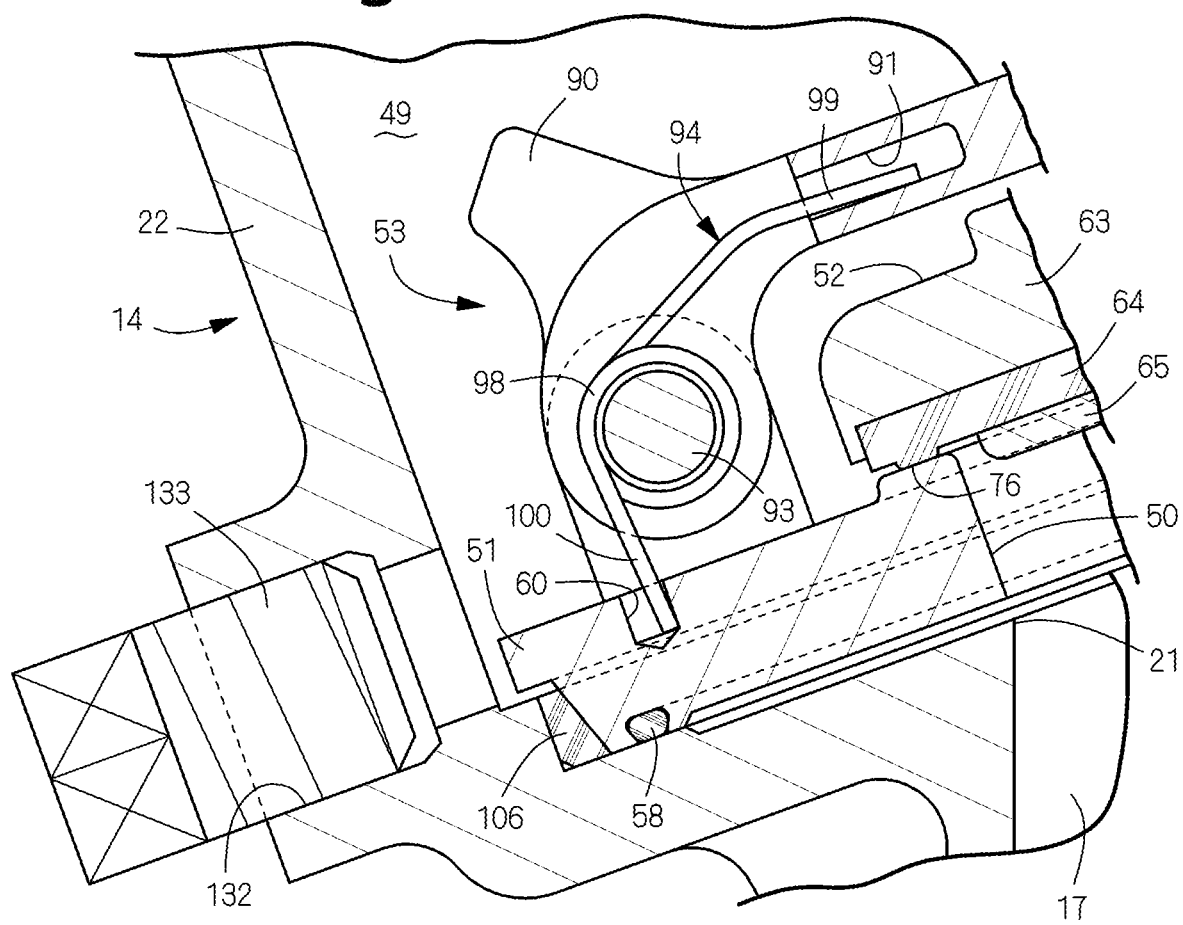
FIG. 6 is a longitudinal cross-sectional front view of a main part of a hinge mechanism of the angle type check valve.
Figure 10:
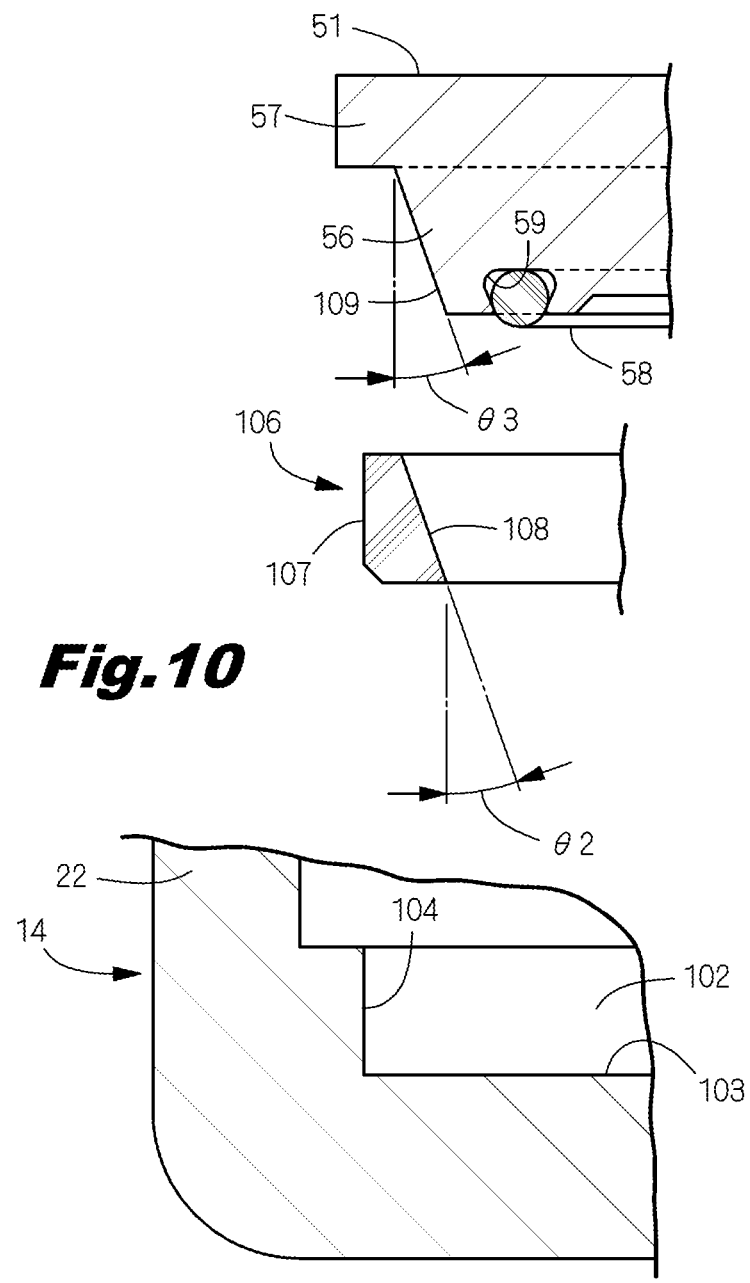
FIG. 10 is a view for explaining a configuration of a seal member.

In FIGS. 6 and 7, reference sign 106 denotes a ring-shaped seal member which is interposed between the valve unit 54 and the unit fitting portion 102 and receives the outer peripheral surface of the valve seat 51. The seal member 106 is made of elastic material rich in smoothness such as polytetrafluoroethylene, an outer peripheral surface 107 thereof is formed in a straight shape having a uniform diameter dimension, and an inner peripheral surface 108 thereof is formed in a tapered shape expanding upward. The outer-diameter dimension of the seal member 106 defined by the outer peripheral surface 107 is set to the dimension identical to the inner-diameter dimension of the fitting wall 104 of the unit fitting portion 102. The seal member 106 is fitted to the unit fitting portion 102 before the valve unit 54 is fitted. As illustrated in FIG. 10, the inclination angle (θ2) of the inner peripheral surface 108 of the seal member 106 is set to be slightly steeper than the inclination angle (θ3) of the outer peripheral surface 109 of the lower seat portion 56 of the valve seat 51. When the valve unit 54 is dropped in and assembled to the unit fitting portion 102, the seal member 106 is slightly deformed by being pressed by the outer peripheral surface 109 of the lower seat portion 56. In the present embodiment, the inclination angle θ2 of the inner peripheral surface 108 of the seal member 106 with respect to the vertical direction is set to 20°, and the inclination angle θ3 of the outer peripheral surface 109 of the lower seat portion 56 with respect to the vertical direction is set to 19°.

As described above, if the seal member 106 made of elastic material is disposed between the valve unit 54 and the unit fitting portion 102, a clearance between the lower seat portion 56 of the valve seat 51 and the fitting wall 104 of the unit fitting portion 102 can be filled with the seal member 106, and the valve unit 54 can be accurately positioned during assembly. Even in a case where the assembling position with respect to the lower seat portion 56 of the valve seat 51 and the unit fitting portion 102 is shifted due to a dimension error in processing, the valve unit 54 can be accurately positioned with respect to the unit fitting portion 102. By selecting polytetrafluoroethylene or the like rich in smoothness as the material of the seal member 106, it is possible to prevent the valve unit 54 from sticking to the unit fitting portion 102, and the valve unit 54 can be more easily removed during replacement of the valve unit 54. Therefore, a replacement operation of the valve unit 54 can be performed more quickly and easily.

Figure 5:
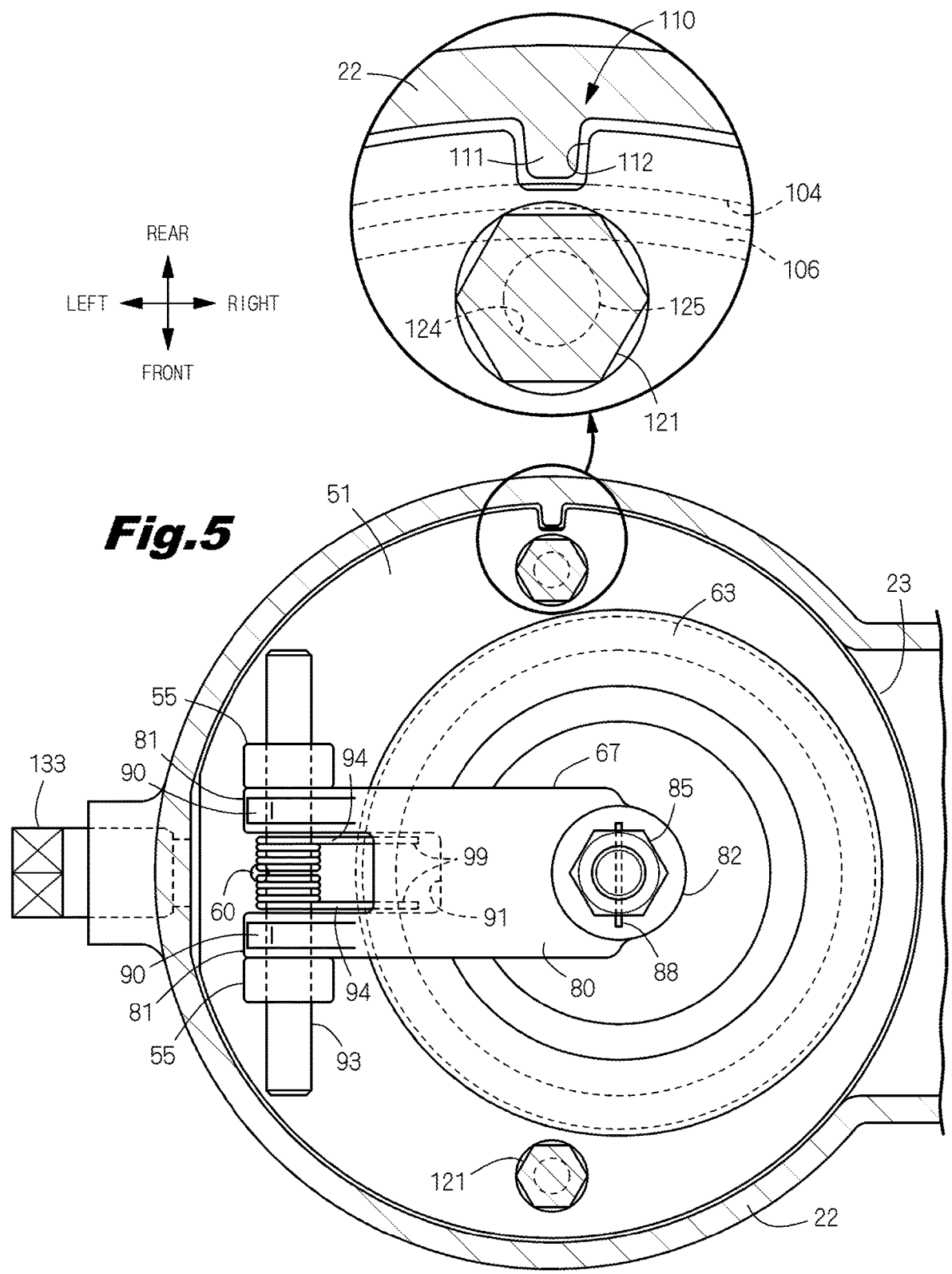
FIG. 5 is a transverse cross-sectional plan view of the angle type check valve.

As illustrated in FIG. 5, an engagement regulating structure 110 for regulating assembling posture of the valve unit 54 to the unit fitting portion 102 of the valve unit 54 is provided between the unit fitting portion 102 and the valve unit 54. The engagement regulating structure 110 is configured of a rib-shaped regulating protrusion (protruding portion) 111 protruding inward from the inner peripheral surface of the cylinder wall 22 of the valve box main body 14, and a recessed portion 112 formed by notching the outer peripheral surface of the upper seat portion 57 of the valve unit 54 to receive the regulating protrusion 111. If the engagement regulating structure 110 is provided as described above, shift in position such as rotation of the valve unit 54 in the unit fitting portion 102 can be prevented, and the valve unit 54 can be held at a proper posture position in the unit fitting portion 102. A guide surface 113 is formed at the upper end of the regulating protrusion 111 so as to be inclined downward toward the inner side of the valve box main body 14 to guide engagement between the recessed portion 112 and the regulating protrusion 111 (see FIG. 7). By only moving the valve unit 54 downward along the regulating protrusion 111 after aligning the regulating protrusion 111 and the recessed portion 112 using the guide surface 113 and engaging both the regulating protrusion 111 and the recessed portion 112, the valve unit 54 can be assembled in proper posture at a proper location in the unit fitting portion 102 as illustrated in FIG. 1.

The valve seat 51 constituting the valve unit 54 is provided with a gripping member 120 for performing a fitting operation of the valve unit 54 to the unit fitting portion 102 through the access hole 20 or a removal operation of the valve unit 54 from the unit fitting portion 102 through the access hole 20. As illustrated in FIG. 4 and FIG. 7, the gripping member 120 is configured of two pillar bodies 121 erected upward from the upper surface of the valve seat 51 so as to avoid the swing locus of the valve body 52 about the hinge shaft 93, and a beam body 122 bridged between the upper ends of the pillar bodies 121. Similarly to the pillar body 121, the beam body 122 is also formed so as to avoid the swing locus of the valve body 52 around the hinge shaft 93. An elastic body 123 is provided on the beam body 122. The pillar body 121 is a metal molded product formed in a polygonal cross section (hexagonal shape) (see FIG. 5), and a male screw portion 125 screwed into a female screw portion 124 formed in the valve seat 51 is engraved in the lower end of the pillar body (see FIG. 4). At the upper end of the pillar body 121, a female screw portion 127 for a screw 126 is formed. As illustrated in FIG. 5, the two pillar bodies 121, 121 are formed at diagonal positions located in front of and behind the central portion of the valve seat 51 formed in a substantially circular shape in plan view. The arrangement direction of the two pillar bodies 121, 121 defined by connecting the formation positions of the two pillar bodies 121, 121 coincides with the extending direction of the hinge shaft 93. Since the pillar body 121 is formed in a polygonal cross section, the pillar body 121 can be screwed into the female screw portion 124 of the valve seat 51 by rotating the pillar body 121 using a tool.

The beam body 122 is a metal molded product formed in a rectangular cross section, and through holes for the screws 126 are formed at both front and rear ends thereof. A recessed groove 130 for the elastic body 123, having an upward opening is formed in the central portion in the front-rear direction of the beam body 122. As illustrated in FIG. 7, the elastic body 123 is a leaf spring made of a long metal piece and having a center portion in the front-rear direction bent upward. As illustrated in FIG. 4, the elastic body 123 is configured such that when the elastic body 123 is dropped in and is fitted to the recessed groove 130, the upper end portion of the elastic body 123 protrudes from the upper surface of the beam body 122.

When the lid body 15 is fitted to the access hole 20, the lower surface of the back lid portion 40 of the lid body 15 contacts the central portion of the elastic body 123, and the beam body 122 and the pillar bodies 121 are pressed down through the elastic member 123. Thus, by pressing the valve seat 51 of the valve unit 54 against the unit fitting portion 102, the valve unit 54 can be fitted and fixed in the unit fitting portion 102 such that the valve unit 54 is not loosely fitted. As described above, in the foot valve 5 according to the present embodiment, since the valve unit 54 can be fixed to the unit fitting portion 102 only by fitting the lid body 15 in the access hole 20, a special structure such as a fastening structure using a bolt or the like for fitting the valve unit 54 to the unit fitting portion 102 is unnecessary, and the replacement operation of the valve unit 54 can be performed more easily and quickly. In addition, if a configuration is adopted in which the valve unit 54 is pressed down through the elastic body 123, it is possible to press the valve unit 54 against the unit fitting portion 102 by optimal pushing force even in a case where the thickness dimension of the lid body 15 or the length dimension of the pillar body 121 slightly differs due to a dimension error in processing.

Figure 9:
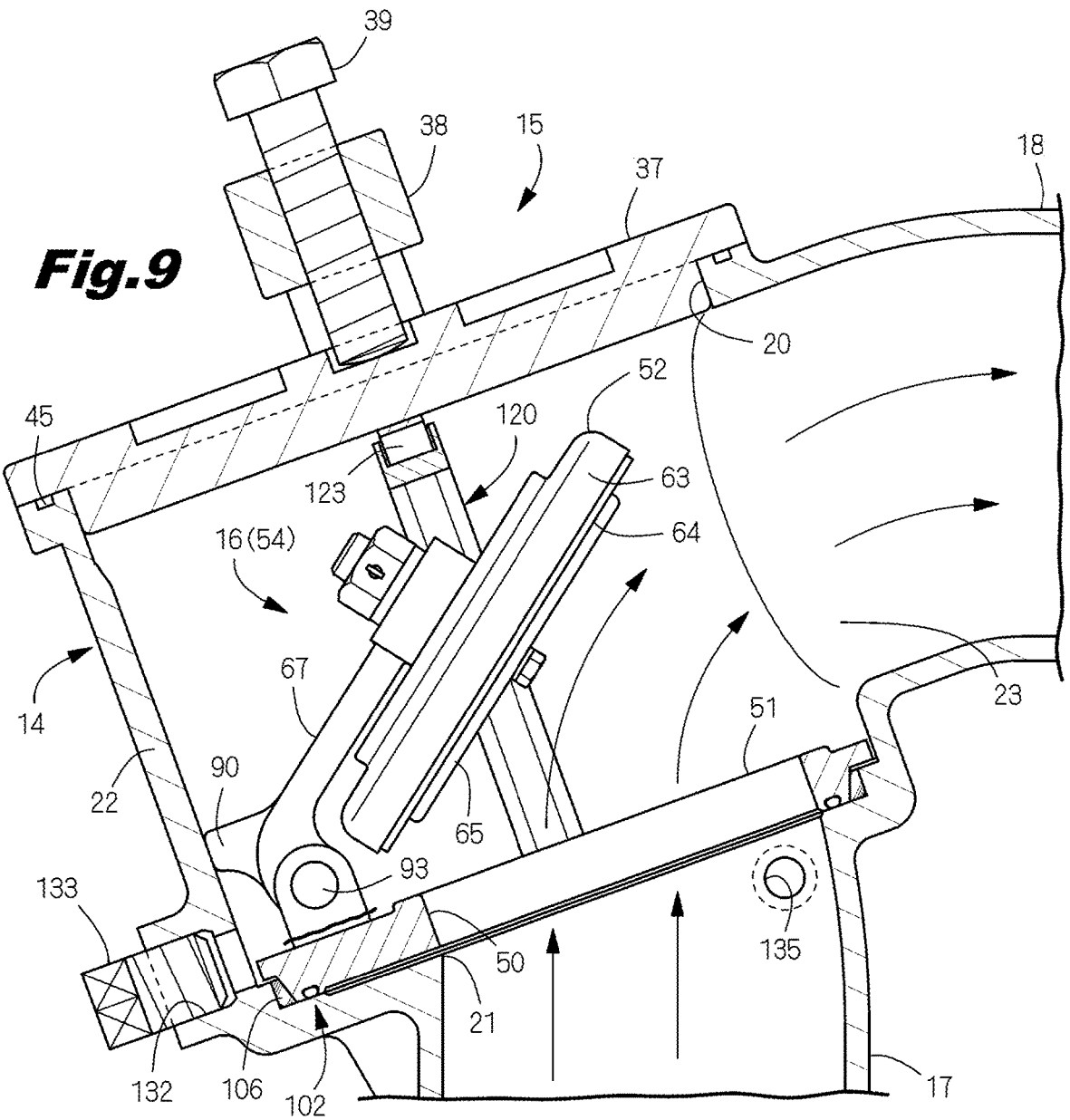
FIG. 9 is a view for explaining operation of the angle type check valve.

In FIGS. 1, 6, and 9, reference sign 132 denotes a fluid discharge hole for discharging the liquid L which exists in the valve box main body 14 during replacement of the valve unit 54, and reference sign 133 denotes a cap configured to be attachable and detachable so as to block the fluid discharge hole 132. A screw engagement structure configured of a male screw portion and a female screw portion is provided between the fluid discharge hole 132 and the cap 133. By rotating the cap 133 counterclockwise, the cap 133 can be removed from the fluid discharge hole 132. By rotating the cap 133 clockwise, the cap 133 can be fitted to the fluid discharge hole 132. The fluid discharge hole 132 is formed at the lower left end portion of the cylinder wall of the valve box main body 14. In other words, the fluid discharge hole 132 is opened at the lowermost portion of the valve box main body 14. The liquid L in the valve box main body 14 can be easily discharged to the outside of the valve box main body 14 only by removing the cap 133 during replacement of the valve unit 54.

In FIGS. 1 and 9, reference sign 135 denotes an air hole provided in the inflow cylinder 17, and similarly to the above-described fluid discharge hole 132, a cap, not illustrated, is detachably fitted to the air hole. The attachment and detachment configuration of the cap is similar to that of the above-described fluid discharge hole 132. During replacement of the valve unit 54, by removing the cap and opening the air hole 135, air can be introduced into the inflow cylinder 17 to eliminate a negative pressure state of the inflow cylinder 17 side with respect to the valve box main body 14 side. Therefore, it is possible to easily remove the valve unit 54 from the unit fitting portion 102. Note that when the cap is removed and the air hole 135 is opened as described above, the liquid L in the suction pipe 10 falls into the liquid reservoir 1. In addition, after the valve unit 54 is replaced, by connecting a vacuum pump to the air hole 135, it is possible to lift the liquid L from the liquid reservoir 1 through the suction pipe 10 to the inflow cylinder 17 to use the liquid L as priming water. As a result, the load on the pump 2 is reduced and the pumping system can be restored more quickly.

In the foot valve 5 configured as described above, when suction force acting on the liquid L sucked up from the liquid reservoir 1 through the suction pipe 10 by starting the pump 2 exceeds pressing force defined by the weight of the valve body 52 and urging force of the presser springs 94 (minimum operation pressure of the valve body 52), the valve body 52 separates from the valve seat 51 and is in the opening posture for opening the valve port 50 (see FIG. 9). As illustrated in FIG. 1, the valve body 52 in the closing posture is in an inclined posture gently inclined upward to the right, and the suction force acting on the valve body 52 upon start of the pump 2 concentrates on the upper right end portion of the valve body 52 separated from the hinge shaft 93. Therefore, according to the foot valve 5 according to the present embodiment, the minimum operation pressure of the valve body 52 can be made smaller and the valve body 52 can be changed from the closing posture to the opening posture more lightly. As described above, the swing limit of the valve body 52 about the hinge shaft 93 in the opening posture is defined by the regulating protrusion 90 contacting the inner wall surface of the cylinder wall 22. The valve body 52 in a state of reaching the swing limit is in an inclined posture in which the right end portion thereof is oriented diagonally upward. If a configuration is adopted in which the valve body 52 is in the inclined posture in the opening posture as described above, the flow direction of the liquid L sucked up into the valve box main body 14 through the inflow port 21 can be smoothly turned toward the outflow port 23 by the lower surface of the valve body 52. Therefore, pressure loss of the foot valve 5 can be reduced.

In addition, in the foot valve 5 according to the present embodiment, the cylindrical valve box main body 14 is set in an inclined posture in which the axis direction (d1) thereof is inclined at θ1° with respect to the vertical direction (dv), and the attachment surface 103 of the unit fitting portion 102 is inclined at θ1°. Therefore, even in a case where the opening angle of the valve body 52 is small, the opening angle of the valve body 52 with respect to the left-right horizontal direction (dh) of the valve body 52 can be made large in combination with the inclination angle of the attachment surface 103, and the valve body 52 can be oriented to the outflow port 23. As described, even in a case where the opening angle of the valve body 52 is small, the flow direction of the liquid L sucked up into the valve box main body 14 through the inflow port 21 can be smoothly turned toward the outflow port 23 by the lower surface of the valve body 52. Therefore, also in this respect, pressure loss of the foot valve 5 can be reduced.

At this time, by setting θ1 to not less than 10° and not greater than 40°, it is possible to reduce the size of the foot valve 5 and to reliably obtain the above effect of reducing the pressure loss while favorably securing operation stability of the foot valve 5. That is, similarly to the foot valve 5 according to the present embodiment, in a case where the valve box main body 14 adopts a mode in which the upper end side thereof is oriented diagonally upward to the left and the lower end side thereof is oriented obliquely downward to the right, the axis direction (d1) of the cylinder is inclined at θ1° with respect the vertical direction (dv), the inflow port 21 is provided on the lower side of the valve box main body 14 and the outflow port 23 is provided on the right side of the valve box main body 14, and the valve chamber 49 that is bent and extends from the inflow port 21 on the lower side to the outflow port 23 on the right side is formed inside the valve box main body 14, it is preferable that the above angle θ1 is set within the range of $10° \leq θ1 \leq 40°$.

If θ1 is less than 10°, in order to smoothly turn the flow direction of the liquid L sucked up into the valve box main body 14 through the inflow port 21 toward the outflow port 23 side by the valve body 52, it is necessary to increase the opening angle of the valve body 52 in the opening posture (increase the opening angle to not less than) 80°) and to open the valve body 52 to a substantially vertical posture. Therefore, if the size the valve body 52 is increased, it is inevitable that the length dimension of the valve box main body 14 is increased correspondingly. As a result, there is a disadvantage that the size of the foot valve 5 is increased. In contrast, when θ1 exceeds 40°, since turning action of the liquid L toward the outflow port 23 caused by the valve body 52 is obtained with a small opening angle, the length dimension of the valve box main body 14 is made small and the size of the foot valve 5 can be reduced. However, closing action of the valve body 52 due to its own weight when the pump 2 is stopped cannot be expected, and operational stability of the foot valve 5 may be impaired. Even though the above problem can be solved by increasing urging force of the presser spring 94; however, in that case, there is disadvantage that the minimum operation pressure of the valve body 52 is increased.

If bubbles contained in the liquid L sucked up through the inflow port 21 stagnate in the valve chamber 49 and the stagnating air flows toward the pump 2 at a time, a malfunction state of so-called "air entrainment" in which the stagnated air is entrained in the pump 2, resulting in suction failure of the pump 2, may occur. In the present embodiment, the valve box main body 14 is formed in the inclined posture in which the upper end side thereof is oriented diagonally upward to the left. Therefore, even in a case where bubbles are contained in a liquid entered through the inflow port 21, the bubbles can be guided smoothly toward the outflow port 23 opened on the right side of the cylinder wall 22. Therefore, it is difficult for the bubbles contained in the liquid L sucked up through the inflow port 21 to stagnate in the valve chamber 49, and it is possible to reliably prevent occurrence of the malfunction state, that is, air entrainment.

When driving of the pump 2 is stopped and pressing force defined by the weight of the valve body 52 and urging force of the presser springs 94 exceeds the suction force generated by the pump 2 and acting on the liquid L, the valve body 52 is changed in the closing posture (see FIG. 1). As a result, the valve port 50 is immediately closed. Therefore, it is possible to prevent falling of the liquid L in the suction pipe 10.

In the foot valve 5 configured as described above, it is possible to perform a replacement operation of the valve unit 54 and a restoration operation of the pumping system in the following procedure. First, an operator stops the pump 2, and then removes the cap 133 to open the fluid discharge hole 132. As a result, it is possible to discharge the liquid L in the transfer pipe 11, the outflow cylinder 18, and the valve box main body 14 to the outside of the foot valve 5. Next, the operator removes the cap and opens the air hole 135. As a result, the liquid L in the inlet cylinder 17 and the suction pipe 10 can be dropped into the liquid reservoir 1 and air can be introduced into the inlet cylinder 17 and the suction pipe 10. Therefore, it is possible to make the pressure on the inflow cylinder 17 side equal to the pressure on the valve box main body 14 side. As a result, it is possible to prevent the pressure on the inflow cylinder 17 side from becoming negative. Therefore, the valve unit 54 can be easily removed from the unit fitting portion 102.

Next, the operator removes the lid body 15 from the valve box main body 14. Specifically, the operator rotates the operation bolt 39 of the lid body 15 counterclockwise, shifts the operation bolt 39 upward, and releases the press-fitted state of the lid main body 37 with the cylinder end surface 22a of the valve box main body 14. Next, the operator rotates the support 38 counterclockwise to release the engagement state between the fitting groove 47 and the retaining claw 44. Next, the operator grips the support 38, lifts the support 38 upward, and removes the lid body 15 from the valve box main body 14.

By the above-described lifting operation of the lid body 15, it is possible to release the press-fitted state of the valve unit 54 with the unit fitting portion 102 caused by the gripping member 120. Specifically, if the operator lifts the lid body 15, a contact state between the back lid portion 40 of the lid body 15 and the elastic body 123 of the gripping member 120 is released. Therefore, downward pushing force of the lid body 15 acting on the valve unit 54 through the gripping member 120 is released. Next, the operator grips the beam body 122 and lifts entirety of the valve unit 54 together with the beam body 122. Thus, the valve unit 54 can be removed from the unit fitting portion 102.

When the removal operation of the valve unit 54 from the unit fitting portion 102 as described above is completed, the operator assembles a new valve unit 54 to the unit fitting portion 102 of the valve box main body 14. Specifically, the operator grips the beam body 122, engages the recessed portion 112 with the regulating protrusion 111, and moves the valve unit 54 downward along the regulating protrusion 111. As a result, the valve unit 54 can be assembled into the unit fitting portion 102. Note that before assembling the new valve unit 54 as described above, it is also possible to clean the inside of the valve box main body 14. If necessary, the seal member 106 may be replaced.

Next, the lid body 15 is assembled to the valve box main body 14. Specifically, after dropping the back lid portion 40 of the lid body 15 in the access hole 20, the operator aligns the retaining claw 44 with the opening of the fitting groove 47, rotates the support 38 clockwise to insert and engage the retaining claw 44 into and with the fitting groove 47, and fits the support 38 to the valve box main body 14. Next, the operator rotationally operates the operation bolt 39 clockwise, shifts the operation bolt 39 downward, presses down the lid main body 37 to press-fit the outer peripheral edge of the front lid portion 41 to the cylinder end surface 22a of the valve box main body 14 to fit and fix the lid body 15 to the valve box main body 14. By pressing down the lid main body 37 using the operation bolt 39 as described above, it is possible to press the valve seat 51 of the valve unit 54 against the unit fitting portion 102 and fit and fix the valve unit 54 in the unit fitting portion 102 such that the valve unit 54 is not loosely fitted.

Next, the operator fits the cap 133 to the fluid discharge hole 132, connects the vacuum pump to the air hole 135, lifts the liquid L from the liquid reservoir 1 through the suction pipe 10 to the inflow cylinder 17 by the vacuum pump, and seals the air hole 135 with the cap. Note that the liquid L lifted up to the inflow cylinder 17 becomes priming water. Finally, the operator drives the motor 8 of the pump 2 to pump the liquid L in the suction pipe 10 to the transfer pipe 11 and then to the discharge pipe 4 through the foot valve 5.

At this time, since the difference in pressure between the primary side on the inflow cylinder 17 side and the secondary side on the valve box main body 14 side with the valve body 52 interposed therebetween becomes equal to or higher than the minimum operation pressure of the valve body 52, the valve body 52 is in the opening posture, and the liquid L flows from the inlet port 12 to the outlet port 13. In this manner, the replacement operation of the valve unit 54 and the restoration operation of the pumping system are completed.

As described above, according to the foot valve 5 according to the present embodiment, the water stopping portion 16 is formed as a unit part as the valve unit 54. Therefore, only by replacing entirety of the valve unit 54, the valve seat 51, the valve body 52, the packing member 64, and the like can be replaced at a time, and the maintenance operation of the foot valve 5 can be performed quickly with less trouble. The foot valve 5 is also excellent in that it is possible to replace the valve unit 54 while maintaining the connection state of piping such as the suction pipe 10 and the transfer pipe 11 without releasing the connection state of the piping, and the maintenance work after installation is extremely easy.

In addition, in the foot valve 5 according to the present embodiment, the gripping member 120 is provided on the valve seat 51. Therefore, even though the unit fitting portion 102 is formed on the lower side of the valve chamber 49, access to the valve unit 54 attached to the unit fitting portion 102 is made remarkably easier through the access hole 20. Therefore, a maintenance operator can perform a fitting operation and a removing operation of the valve unit 54 to and from the unit fitting portion 102 quickly with high work efficiency. Since the maintenance operator can perform the fitting operation and the removing operation of the valve unit 54 by gripping the gripping member 120, it is possible to reduce the influence of the skill degree of the maintenance operator and the influence of difference in physical strength of the maintenance operators and to perform the removal operation with high work efficiency. Fingers are not brought into contact with the urging member 94, and it is possible to reliably prevent the occurrence of an installation failure during the fitting operation.

Second Embodiment

Figure 11:
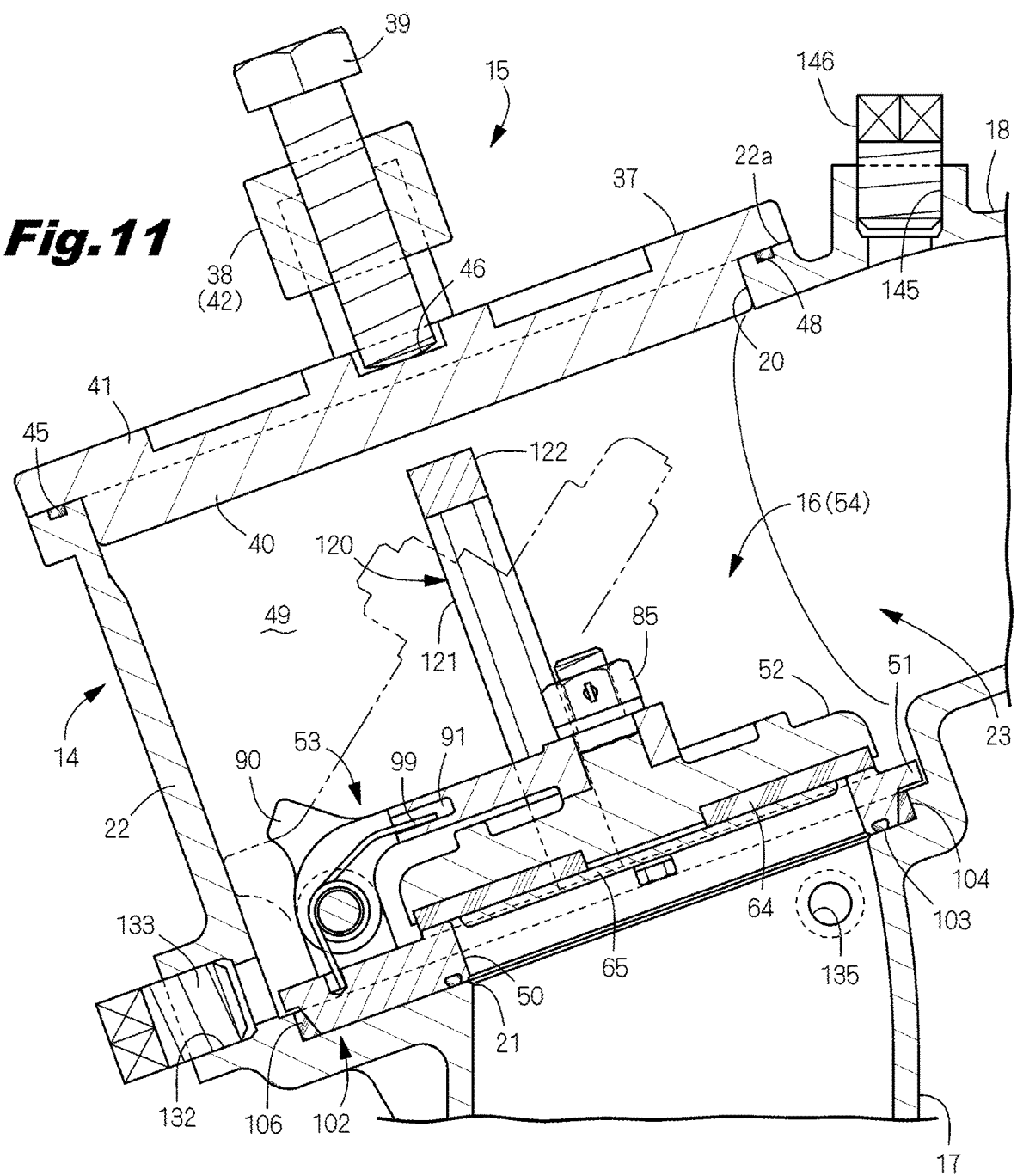
FIG. 11 is a longitudinal cross-sectional front view of a main part of an angle type check valve according a second embodiment of the present invention.
Figure 12:
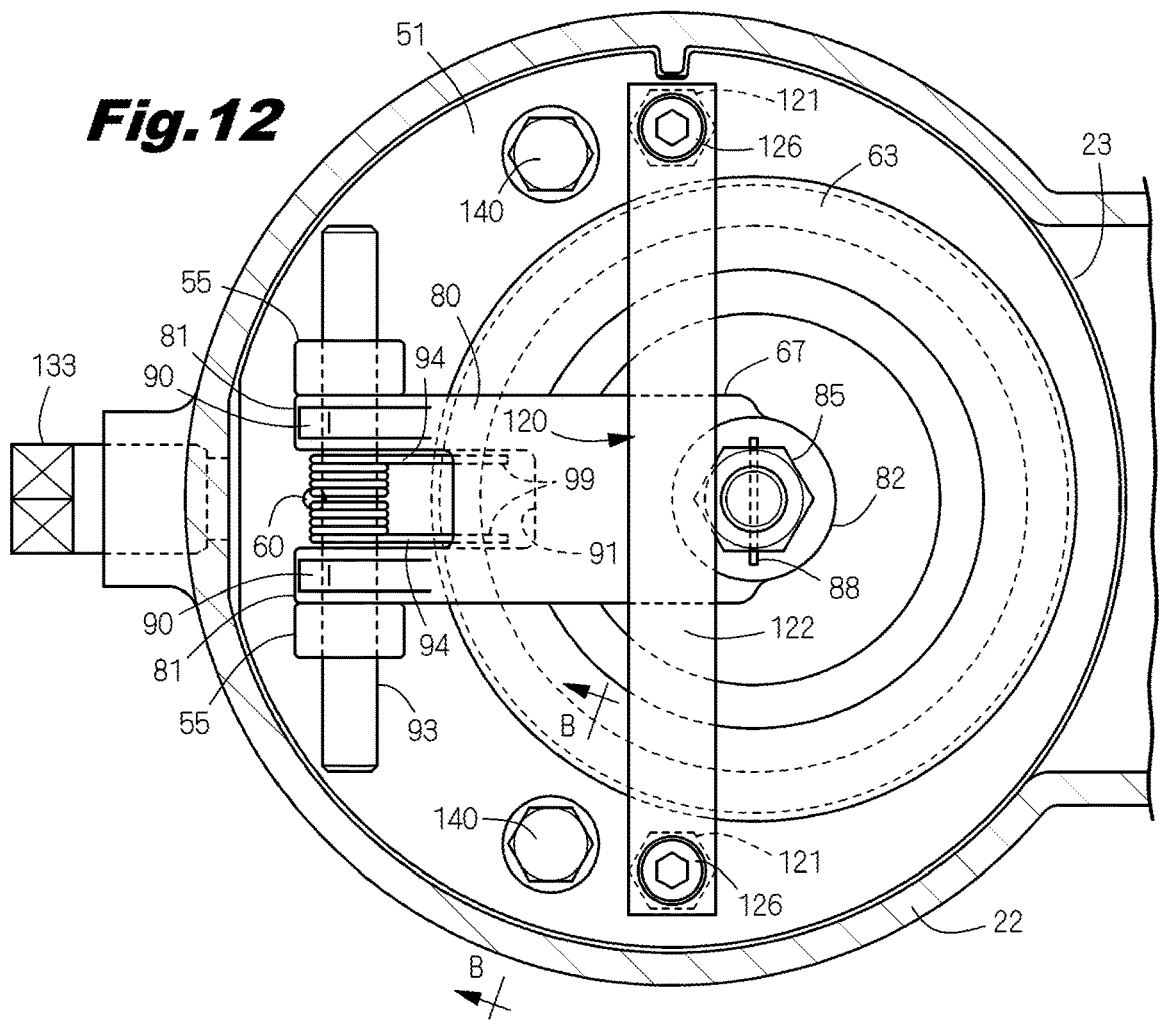
FIG. 12 is a transverse cross-sectional plan view of the angle type check valve.
Figure 13:
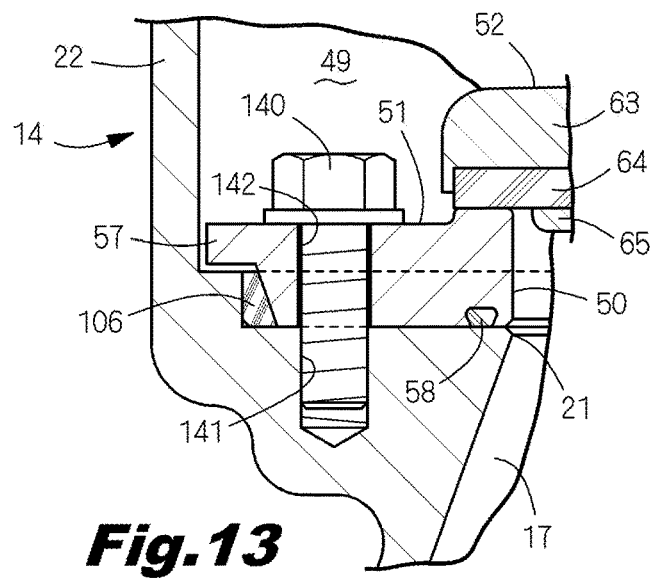
FIG. 13 is a cross-sectional view taken along line B-B in FIG. 12.

FIGS. 11 to 13 illustrate a second embodiment of the angle type check valve according to the present invention. The angle type check valve according to the second embodiment differs from that in the first embodiment described above in that a valve unit 54 is fixed to a unit fitting portion 102 by a fastening structure including screws 140, in that the length dimension of a pillar body 121 is shortened and an upper end of a gripping member 120 is not in contact with a back surface of a lid body 15, and in that a connection hole 145 for a pressure gauge is provided on an upper side of an outflow cylinder 18. The points other than the above are similar to those of the first embodiment. Therefore, identical members are denoted by identical reference signs, and the explanation thereof is omitted. Reference sign 146 denotes a cap configured to be attachable and detachable so as to close the connection hole 145. The structure of the connection hole 145 and the structure of the cap 146 for the pressure gauge are similar to those of the fluid discharge hole 132 and the cap 133 described above.

The fastening structure is configured of a pair of front and rear female screw portions 141, 141 provided on an attachment surface 103 of a unit fitting portion 102, a pair of front and rear through holes 142, 142 opened in a valve seat 51, and screws 140, 140 screwed into the female screw portions 141 through the through holes 142. A configuration is adopted in which when the valve unit 54 is dropped in the unit fitting portion 102 by using the engagement regulating structure 110, the through holes 142 and the female screw portions 141 are aligned with each other. From this state, by screwing the screws 140, 140 into the female screw portions 141 through the through holes 142, the valve unit 54 can be fixed to the unit fitting portion 102.

Also in the angle type check valve according to the second embodiment, it is possible to obtain operational effects similar to those in the first embodiment. Since a water stopping portion 16 is formed as a unit part as a valve unit 54, only by replacing entirety of the valve unit 54, the valve seat 51, a valve body 52, a packing member 64, and the like can be replaced at a time, and a maintenance operation of a foot valve 5 can be performed quickly with less trouble. The foot valve 5 is also excellent in that it is possible to replace the valve unit 54 while maintaining the connection state of piping such as the suction pipe 10 and the transfer pipe 11 without releasing the connection state of the piping, and the maintenance work after installation is extremely easy.

Third Embodiment

FIG. 14 illustrates a third embodiment of the angle type check valve according to the present invention. The angle type check valve according to the third embodiment differs from that in the above second embodiment in that a valve box main body 14 is in upright posture in which the upper end side of the valve box main body 14 is oriented upward and the lower end side of the valve box main body 14 is oriented downward, and the axis direction (d1) of a cylinder coincides with the vertical direction (dv), and the radial direction (d2) of the cylinder coincides with the horizontal direction (dh). Note that in the third embodiment, a fluid discharge hole 132, an air hole 135, a connection hole 145 for a pressure gauge, and the like are omitted. The points other than the above are similar to those of the above second embodiment. Therefore, identical members are denoted by identical reference signs, and the explanation thereof is omitted.

The specific configuration of a valve unit 54 is not limited to that described in the above embodiment, and in particular the number, the form, or the like of presser springs 94, which constitute the valve unit 54, is appropriately changed according to the intended use of the angle type check valve. The lid body 15 has similar configuration, and the form of the lid body 15 is appropriately changed according to the intended use of the angle type check valve. A pillar body 121 constituting a gripping member 120 is not limited to one having a polygonal cross section (prism), and may be a column. Note that it is preferable that an operation surface for a tool is formed on the outer peripheral surface of the pillar body 121. In a case where a circumstance arises such as sticking of the valve unit 54 to a unit fitting portion 102 due to the weight or a long-time change of the valve unit 54, the valve unit 54 may be lifted by a lift or the like, and in that case, the gripping member 120 is used as a locking element of a hook.

REFERENCE SIGNS LIST

5 Angle type check valve (foot valve)
14 Valve box main body
15 Lid body
20 Access hole 21 Inflow port
22 Cylinder wall
23 Outflow port
49 Valve chamber
50 Valve port
51 Valve seat
52 Valve body
53 Hinge mechanism
54 Valve unit
93 Hinge shaft
94 Urging member (Presser spring)
102 Unit fitting portion
103 Attachment surface
104 Fitting wall
110 Engagement regulating structure
111 Protruding portion (Regulating protrusion)
112 Recessed portion
120 Gripping member
121 Pillar body
122 Beam body

The invention claimed is:

1. An angle type check valve comprising:
   a valve box main body which is provided with an inflow port opened on a lower side, an outflow port opened on a lateral side, and an access hole opened on an upper side, and in which a valve chamber is formed that is bent and extends from the inflow port toward the outflow port;
   a lid body which is configured to be attachable to and detachable from the valve box main body so as to seal the access hole;
   a valve seat which is provided with a valve port at a central portion of the valve seat;
   a valve body which is configured to be capable of changing posture between opening posture for opening the valve port and closing posture for closing the valve port; and
   a hinge mechanism which supports the valve body such that the valve body can swing between the opening posture and the closing posture and which includes a hinge shaft and an urging member that urges the valve body toward the closing posture,
   wherein as a valve unit, the valve seat, the valve body, and the hinge mechanism are integrally assembled so as to be made into a unit part, and the valve unit is configured so as to be attachable to and detachable from a unit fitting portion provided in the valve box main body, the unit fitting portion facing the inflow port,
   wherein the valve seat is provided with the gripping member configured to perform one of a fitting operation of the valve unit to the unit fitting portion through the access hole and a removal operation of the valve unit from the unit fitting portion through the access hole, and
   wherein the gripping member is formed so as to avoid a swing locus of the valve body about the hinge shaft.

2. The angle type check valve according to claim 1,
   wherein the gripping member includes a pair of pillar bodies erected upward from an upper surface of the valve seat, and a beam body bridged between upper end portions of the pillar bodies.

3. The angle type check valve according to claim 2,
   wherein the pillar bodies are erected at locations facing each other across a disc surface central portion of the valve seat, and
   wherein an arrangement direction of the two pillar bodies defined by connecting formation positions of the two pillar bodies coincides with an extending direction of the hinge shaft.

4. The angle type check valve according to claim 1,
   wherein an engagement regulating structure which regulates fitting posture of the valve unit to the unit fitting portion is provided between the unit fitting portion and the valve unit.

5. The angle type check valve according to claim 4,
   wherein the unit fitting portion is configured of an attachment surface which is directed upward and at a center portion of which the inflow port is opened, and a fitting wall which is erected so as to surround the attachment surface, and
   wherein the engagement regulating structure is configured of a protruding portion which protrudes inward from an inner peripheral surface of the valve box main body, and a recessed portion which is formed by notching an outer peripheral surface of the valve seat of the valve unit to receive the protruding portion.

* * * * *